United States Patent
Ohkawa

(10) Patent No.: US 12,188,623 B2
(45) Date of Patent: *Jan. 7, 2025

(54) LIGHT-EMITTING DEVICE, DISPLAY DEVICE, AND ILLUMINATION DEVICE

(71) Applicant: SATURN LICENSING LLC, New York, NY (US)

(72) Inventor: Shingo Ohkawa, Saitama (JP)

(73) Assignee: SATURN LICENSING LLC, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/396,768

(22) Filed: Dec. 27, 2023

(65) Prior Publication Data

US 2024/0200735 A1    Jun. 20, 2024

Related U.S. Application Data

(63) Continuation of application No. 18/086,776, filed on Dec. 22, 2022, now Pat. No. 11,892,129, which is a
(Continued)

(30) Foreign Application Priority Data

Jan. 14, 2014  (JP) .................................. 2014004434
Jun. 12, 2014  (JP) .................................. 2014121159

(51) Int. Cl.
*F21K 9/64*      (2016.01)
*G02F 1/1335*    (2006.01)
*G02F 1/13357*   (2006.01)

(52) U.S. Cl.
CPC .......... *F21K 9/64* (2016.08); *G02F 1/133603* (2013.01); *G02F 1/133606* (2013.01);
(Continued)

(58) Field of Classification Search
CPC ......... G02F 1/133603; G02F 1/133605; G02F 1/133614; G02F 1/133606; G02F 1/133608; G02F 1/133609; F21K 9/64
See application file for complete search history.

(56) References Cited

U.S. PATENT DOCUMENTS

D687,179 S    7/2013 Kim
8,919,978 B2  12/2014 Lin
(Continued)

FOREIGN PATENT DOCUMENTS

CN    101452149    6/2009
CN    102305371    1/2012
(Continued)

OTHER PUBLICATIONS

Extended European Search Report for EP Application No. 15150344.8, dated May 28, 2015. -*cited in parent app.

*Primary Examiner* — Erin Kryukova
(74) *Attorney, Agent, or Firm* — Richard LaPeruta

(57) ABSTRACT

A light-emitting device includes: a plurality of light sources configured to be disposed on a substrate; a light diffusion member configured to commonly cover the plurality of light sources; and a plurality of wavelength conversion members configured to be disposed between the light sources and the light diffusion member in a thickness direction and disposed in regions corresponding to the plurality of light sources in a plane, respectively, and configured to convert light with a first wavelength from the light sources into light with a second wavelength.

20 Claims, 42 Drawing Sheets

Related U.S. Application Data continuation of application No. 17/405,570, filed on Aug. 18, 2021, now Pat. No. 11,572,986, which is a continuation of application No. 14/591,411, filed on Jan. 7, 2015, now Pat. No. 11,143,365.

(52) U.S. Cl.
CPC .. *G02F 1/133608* (2013.01); *G02F 1/133609* (2013.01); *G02F 1/133614* (2021.01)

(56) References Cited

U.S. PATENT DOCUMENTS

| | | |
|---|---|---|
| 9,128,326 B2 | 9/2015 | Cho et al. |
| 11,112,649 B1 | 9/2021 | Zhao |
| 2006/0072315 A1 | 4/2006 | Han et al. |
| 2006/0290840 A1* | 12/2006 | Bang ................ G02F 1/133603 349/69 |
| 2007/0069227 A1 | 3/2007 | Grotsch et al. |
| 2007/0085105 A1 | 4/2007 | Beeson et al. |
| 2007/0145398 A1 | 6/2007 | Shin |
| 2008/0049443 A1 | 2/2008 | Lee |
| 2008/0111949 A1* | 5/2008 | Shibata ............. G02F 1/133606 349/64 |
| 2008/0170176 A1 | 7/2008 | Shen |
| 2008/0231162 A1 | 9/2008 | Kurihara et al. |
| 2008/0284942 A1 | 11/2008 | Mahama et al. |
| 2009/0051268 A1* | 2/2009 | You ...................... C09K 11/612 313/503 |
| 2009/0101930 A1 | 4/2009 | Li |
| 2009/0141492 A1 | 6/2009 | Fujino et al. |
| 2009/0153771 A1 | 6/2009 | Huo et al. |
| 2010/0002413 A1 | 1/2010 | Igarashi et al. |
| 2010/0244058 A1* | 9/2010 | Weng ................ G02F 1/133603 257/E33.001 |
| 2010/0246160 A1 | 9/2010 | Ito et al. |
| 2010/0283914 A1 | 11/2010 | Hamada |
| 2011/0164203 A1 | 7/2011 | Kimura |
| 2011/0205727 A1 | 8/2011 | Kim et al. |
| 2011/0210360 A1 | 9/2011 | Negley et al. |
| 2011/0242838 A1 | 10/2011 | Hong et al. |
| 2011/0265540 A1 | 11/2011 | Boyer |
| 2011/0304524 A1 | 12/2011 | Seen |
| 2011/0315956 A1 | 12/2011 | Tischler et al. |
| 2012/0086884 A1 | 4/2012 | Yoshikawa |
| 2012/0126266 A1 | 5/2012 | Watari et al. |
| 2012/0133901 A1 | 5/2012 | Miura |
| 2012/0140520 A1 | 6/2012 | Jung |
| 2012/0218752 A1* | 8/2012 | Sumitani ........... G02F 1/133605 362/296.01 |
| 2012/0250304 A1 | 10/2012 | Harbers et al. |
| 2012/0327311 A1 | 12/2012 | Kuromizu |
| 2013/0050588 A1* | 2/2013 | Kamada ............ G02F 1/133606 348/739 |
| 2013/0050616 A1 | 2/2013 | Seo et al. |
| 2013/0271961 A1 | 10/2013 | Nakamura |
| 2013/0294107 A1 | 11/2013 | Ohkawa et al. |
| 2013/0336003 A1 | 12/2013 | Yang et al. |
| 2014/0009959 A1 | 1/2014 | Park |
| 2014/0016351 A1 | 1/2014 | Park et al. |
| 2014/0118990 A1 | 5/2014 | Ki |
| 2014/0179037 A1* | 6/2014 | Lai ....................... H01L 33/507 438/27 |
| 2014/0211123 A1 | 7/2014 | Lee et al. |
| 2014/0254127 A1 | 9/2014 | Tan et al. |
| 2015/0023055 A1 | 1/2015 | Hwang et al. |
| 2015/0055052 A1 | 2/2015 | Tanabe |
| 2015/0159834 A1* | 6/2015 | Chang ............... G02F 1/133603 362/297 |
| 2015/0219323 A1* | 8/2015 | Baek ...................... F21V 19/04 362/293 |
| 2016/0126704 A1* | 5/2016 | Horn .................... H01L 33/483 362/249.02 |
| 2017/0068132 A1 | 3/2017 | Li |

FOREIGN PATENT DOCUMENTS

| | | |
|---|---|---|
| CN | 203052397 U | 7/2013 |
| JP | 2006058481 A | 3/2006 |
| JP | 2006526280 A | 11/2006 |
| JP | 2007201171 A | 8/2007 |
| JP | 2009104844 A | 5/2009 |
| JP | 2012155999 A | 8/2012 |
| KR | 20050093919 | 9/2005 |
| WO | 2010150516 A1 | 12/2010 |

* cited by examiner

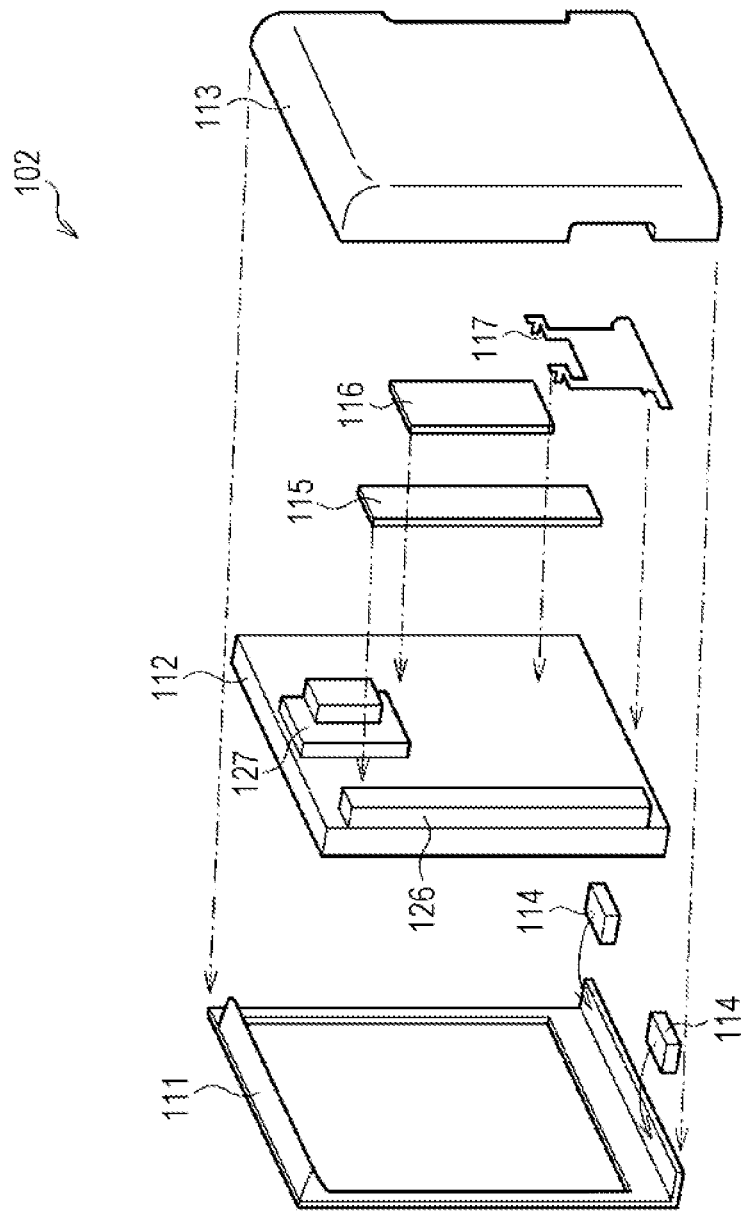

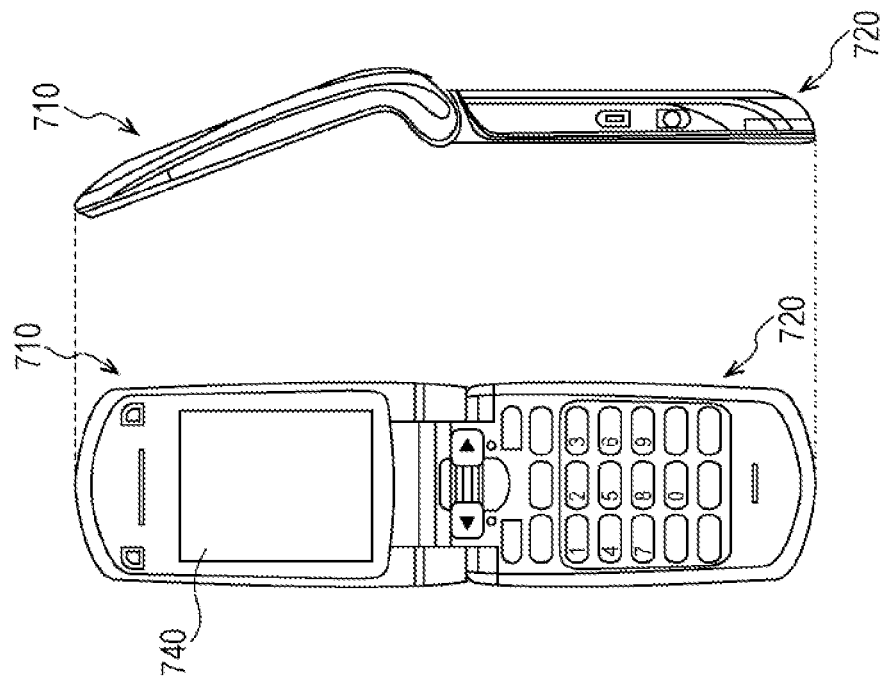
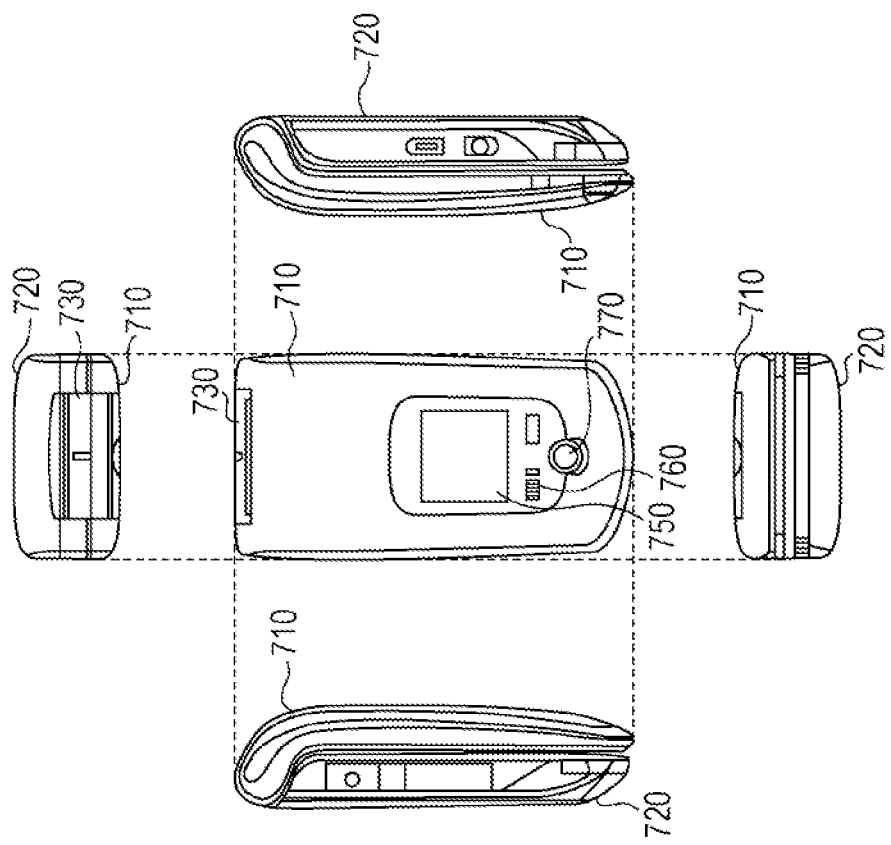

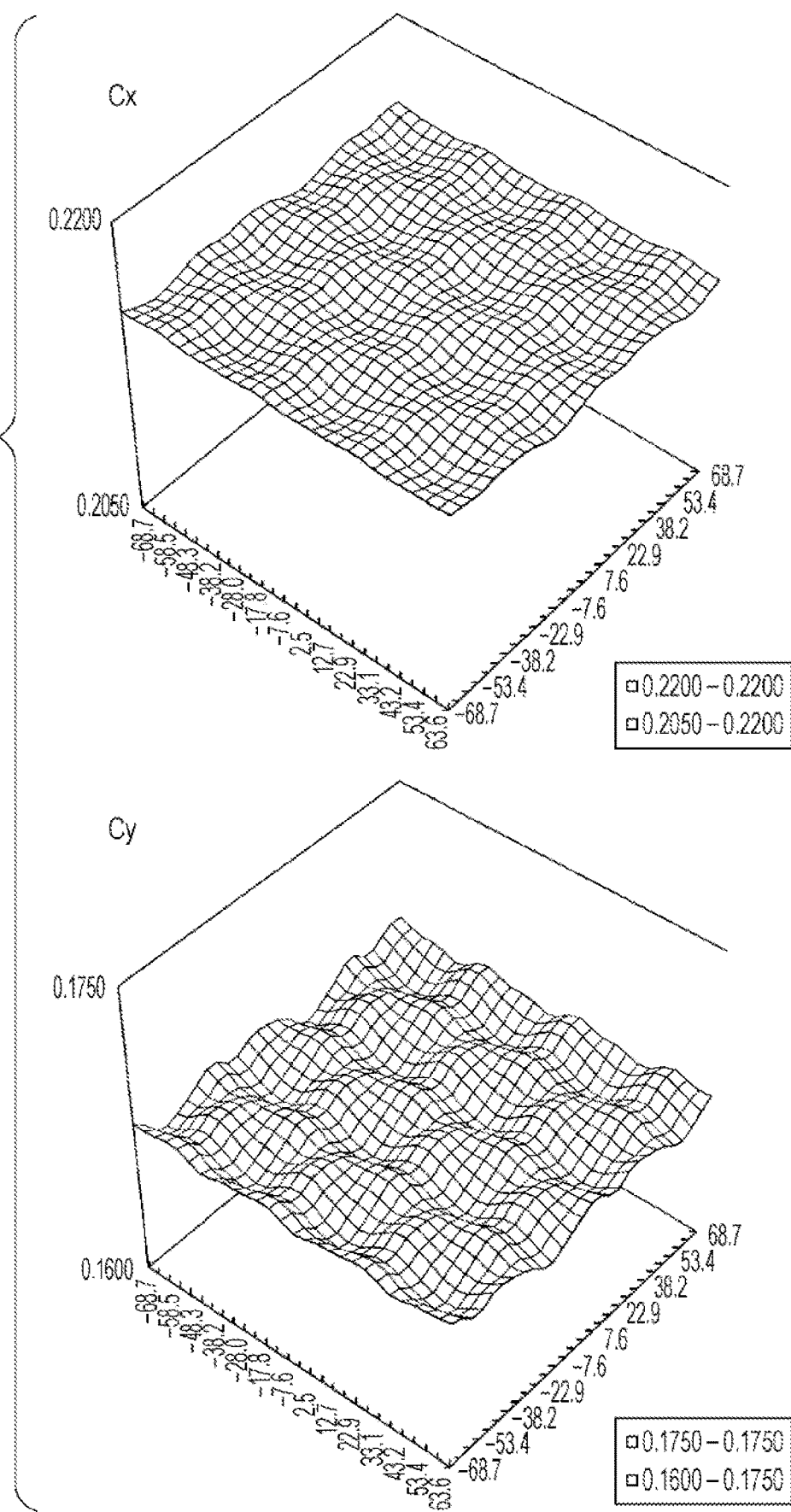

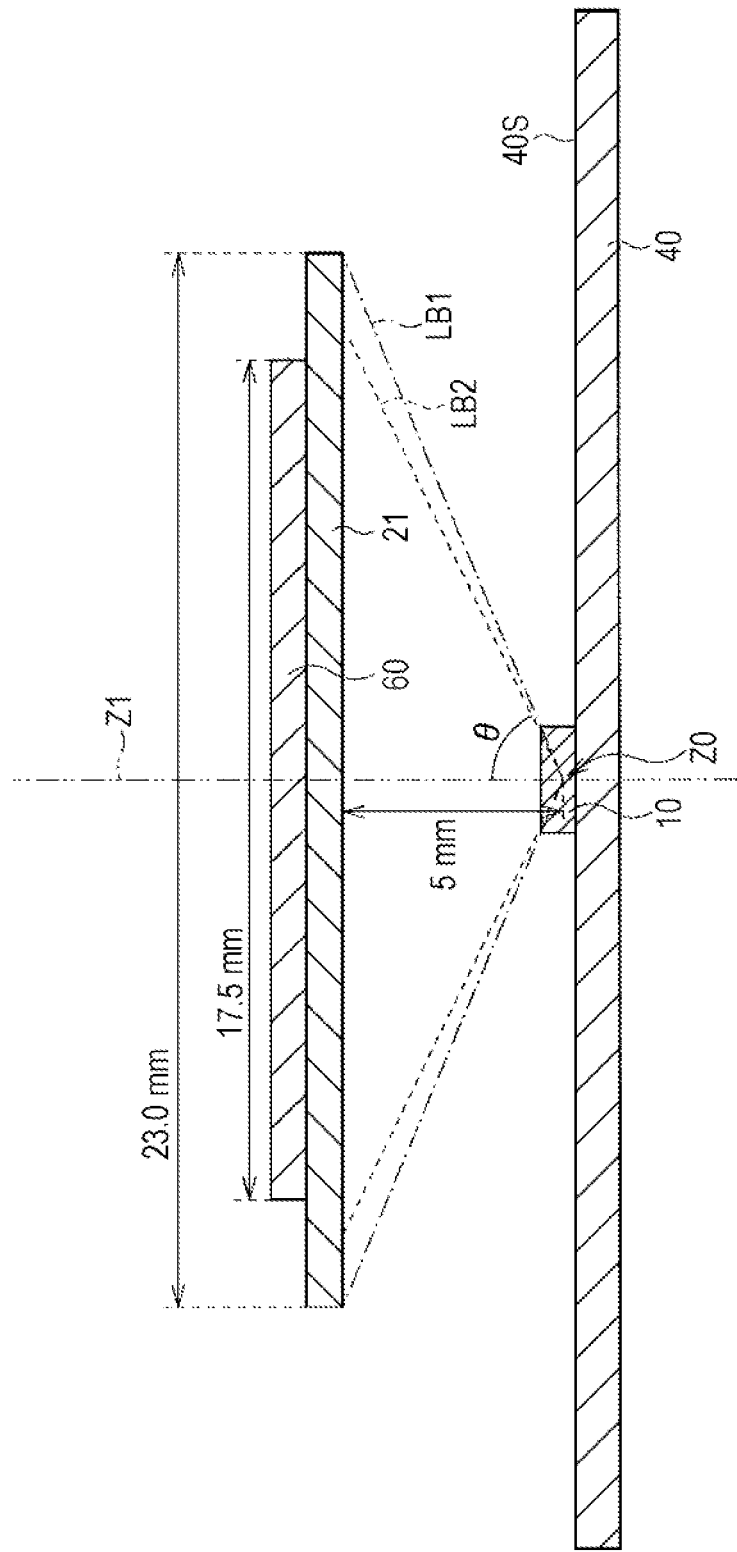

FIG. 31A
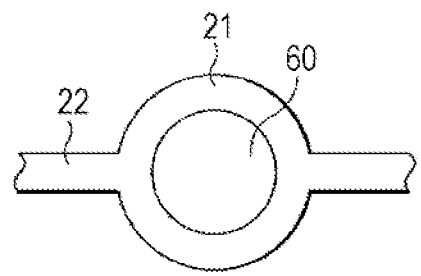
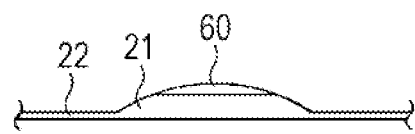
FIG. 31B
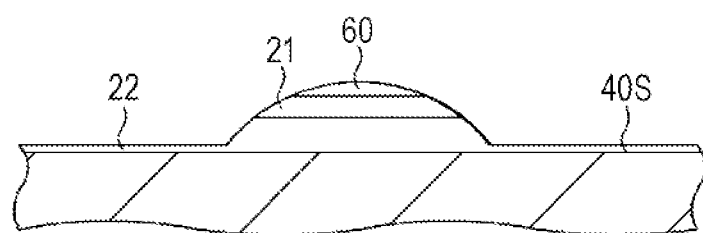

LIGHT-EMITTING DEVICE, DISPLAY
DEVICE, AND ILLUMINATION DEVICE

CROSS REFERENCE TO RELATED
APPLICATIONS

The present application is a continuation of U.S. patent application Ser. No. 18/086,776, filed on Dec. 22, 2022, a continuation of U.S. patent application Ser. No. 17/405,570, filed on Aug. 18, 2021, which is a continuation of U.S. patent application Ser. No. 14/591,411, filed on Jan. 7, 2015, which claims priority from Japanese Patent Application No. JP 2014-004434, filed on Jan. 14, 2014, and Japanese Patent Application No. JP 2014-121159, filed on Jun. 12, 2014, all of which are incorporated herein by reference.

BACKGROUND

The present disclosure relates to a light-emitting device, and a display device and an illumination device including the light-emitting device.

Light-emitting devices using blue light emitting diodes (LEDs) are adopted in backlights, illumination devices, or the like of liquid crystal display apparatuses. For example, Japanese Unexamined Patent Application Publication No. 2012-155999 discloses a device which is a so-called direct-type backlight and in which white light is formed by a combination of a plurality of blue LEDs disposed on a substrate and a wavelength conversion sheet covering all of the blue LEDs. International Publication No. 2010/150516 discloses a surface light source which forms white light and in which a blue LED, a reflection plate, a diffusion sheet, and a fluorescent layer performing wavelength conversion are stacked in order.

SUMMARY

In Japanese Unexamined Patent Application Publication No. 2012-155999, however, yellow is considered to tend to become strong in the periphery of the blue LED rather than immediately above the blue LED. In International Publication No. 2010/150516, the configuration is complicated and there is a concern of a luminance difference between a region immediately above the blue LED and a region of the periphery of the blue LED being recognized as grain irregularity. In light-emitting devices used as surface light sources, in general, it is strongly preferable to efficiently emit light for which luminance irregularity or color deviation is small in a plane.

It is desirable to provide a light-emitting device capable of emitting light with high regularity in a plane with high efficiency, and a display device and an illumination device including the light-emitting device.

According to an embodiment of the present disclosure, there is provided a light-emitting device including: a plurality of light sources configured to be disposed on a substrate; a light diffusion member configured to commonly cover the plurality of light sources; and a plurality of wavelength conversion members configured to be disposed between the light sources and the light diffusion member in a thickness direction and disposed in regions corresponding to the plurality of light sources in a plane, respectively, and configured to convert light with a first wavelength from the light sources into light with a second wavelength. According to another embodiment of the present disclosure, display device and an illumination device include the light-emitting device.

According to still another embodiment of the present disclosure, there is provided another light-emitting device including: a plurality of light sources configured to be disposed on a substrate; a light diffusion member configured to commonly cover the plurality of light sources; and a plurality of wavelength conversion members configured to be disposed between the light sources and the light diffusion member in a thickness direction and have openings or notches in regions other than regions corresponding to the plurality of light sources in a plane, respectively, and configured to convert light with a first wavelength from the light sources into light with a second wavelength.

In the light-emitting device, the display device, and the illumination device according to the embodiments of the present disclosure, the plurality of wavelength conversion members are disposed between the light sources and the light diffusion member in the thickness direction and are disposed in the regions corresponding to the plurality of light sources in the plane, respectively. Thus, wavelength conversion to the light with the second wavelength is appropriately performed while reducing the intensity of the light with the first wavelength directly incident on the light diffusion member from the light sources. The number of used wavelength conversion members is reduced compared to a case in which one sheet-shaped wavelength conversion member is installed across the entire surface.

In the other light-emitting device according to the embodiment of the present disclosure, the wavelength conversion members are disposed between the light sources and the light diffusion member in the thickness direction and have the openings or the notches in the regions other than the regions corresponding to the plurality of light sources in the plane, respectively. Thus, the wavelength conversion to the light with the second wavelength is also appropriately performed while reducing the intensity of the light with the first wavelength directly incident on the light diffusion member from the light sources. The number of used wavelength conversion members is reduced compared to the case in which one sheet-shaped wavelength conversion member is installed across the entire surface.

According to the light-emitting device according to the embodiment of the present disclosure, it is possible to efficiently emit light for which luminance irregularity or color deviation is small in a plane. Therefore, the display device using the light-emitting device can have display performance such as excellent color reproduction. The illumination device using the light-emitting device can illuminate a target object more regularly. The advantages according to the embodiment are not limited thereto, but any of the advantages to be described below may be obtained.

BRIEF DESCRIPTION OF THE DRAWINGS

FIG. 13A is an exploded perspective view illustrating a body unit illustrated in FIG. 12;

FIG. 19A is a front view, a left side view, a right side view, a top view, and a bottom view illustrating the outer appearance of a mobile phone (Application Example 6) which is in a closed state and on which a display device according to an embodiment of the present disclosure is mounted;

FIG. 19B is a front view and a side view illustrating the outer appearance of the mobile phone (Application Example 6) which is in an opened state and on which a display device according to an embodiment of the present disclosure is mounted;

FIG. 24A is a characteristic diagram illustrating a Cx distribution and a Cy distribution in a central region of a light emission surface in Experiment Example 1-1;

FIG. 28C is a schematic diagram illustrating the configuration of main units of a light-emitting device in Experiment Example 3-3;

FIG. 31A is a schematic diagram illustrating the shape of a wavelength conversion unit and a light reflection member according to a fourth modification example;

FIG. 31B is a schematic diagram illustrating the shape of a wavelength conversion unit and a light reflection member according to a fifth modification example.

DETAILED DESCRIPTION OF EMBODIMENTS

Hereinafter, embodiments of the present disclosure will be described in detail with reference to the drawings. The description will be made in the following order.
1. First Embodiment
  Light-emitting Device Including Plurality of Wavelength Conversion Units with Belt-like Shape
2. Second Embodiment
  Light-emitting Device Including Wavelength Conversion Unit in Which Plurality of Openings Are Formed in Net-like Shape
3. Third Embodiment
  Light-emitting Device Including Plurality of Light-shielding Members Each Surrounding Light Source and Modification Examples
4. Fourth Embodiment (Display Device: Liquid Crystal Display Device)
5. Application Examples 1 to 6 of Display Device
6. Application Examples 7 to 9 of Illumination Device
7. Experiment Examples First Embodiment Configuration of Light-Emitting Device 1

Figure 1:
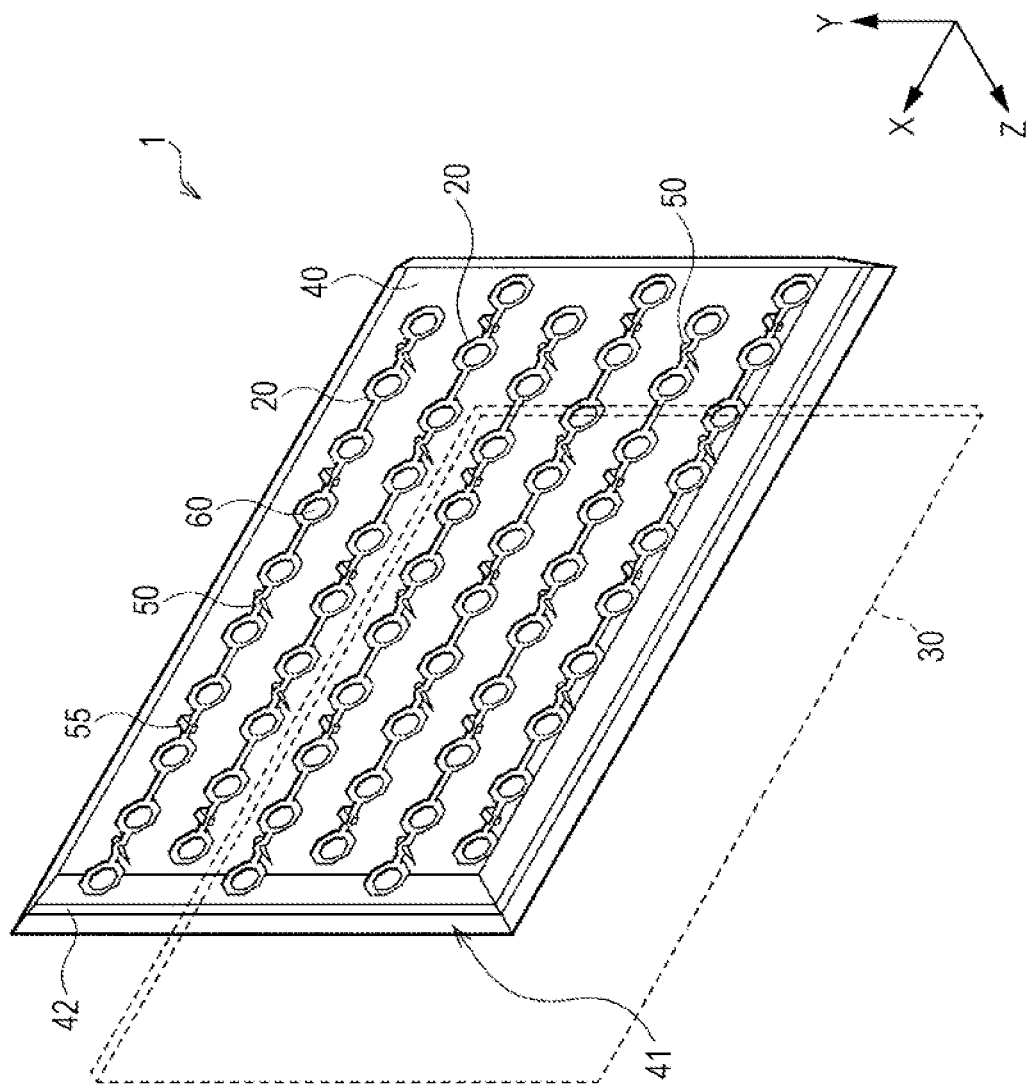
FIG. 1 is a perspective view illustrating an example of the entire configuration of a light-emitting device according to a first embodiment of the present disclosure.
Figure 2A:
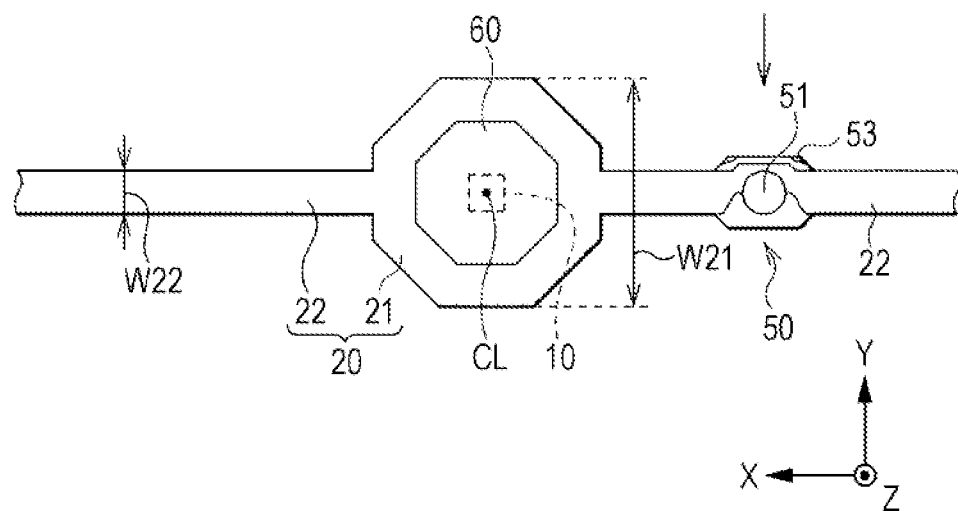
FIG. 2A is a plan view illustrating the configuration of main units of the light-emitting device illustrated in FIG. 1.
Figure 2B:
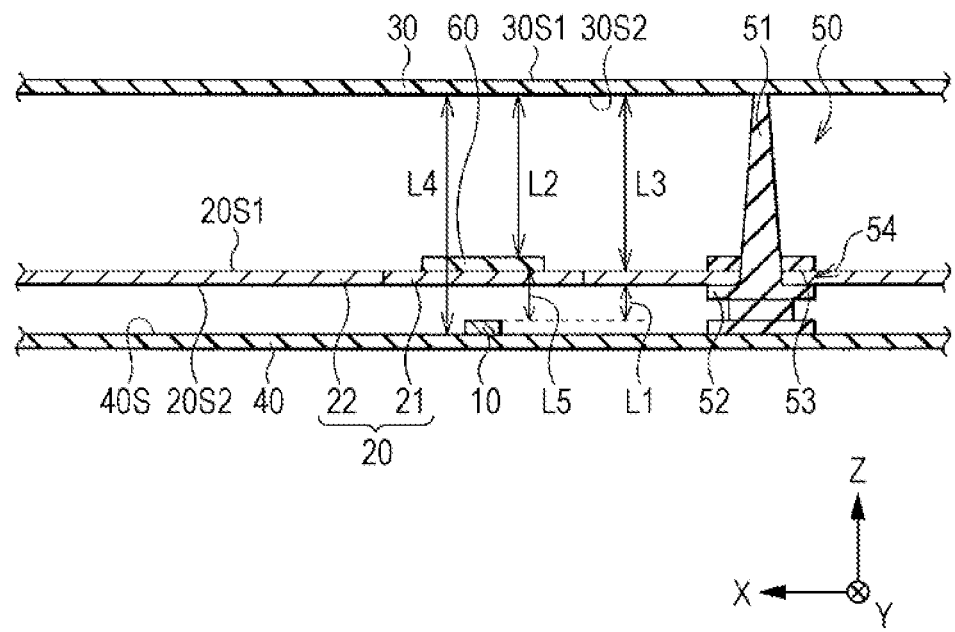
FIG. 2B is a sectional view illustrating the configuration of main units of the light-emitting device illustrated in FIG. 1.

FIG. 1 is a perspective view illustrating the entire configuration of a light-emitting device 1 according to a first embodiment of the present disclosure. FIG. 2A is an expanded plan view illustrating main units of the light-emitting device 1 and FIG. 2B is a sectional view corresponding to the plan view of FIG. 2A. The light-emitting device 1 is used as, for example, a backlight that illuminates a transmissive liquid crystal panel from a rear side or an illumination device indoors or the like. The light-emitting device 1 includes, for example, a plurality of light sources 10 (not illustrated in FIG. 1), wavelength conversion units 20, and an optical sheet 30. The plurality of light sources 10 are arranged on a reflection substrate 40, for example, in a matrix form. The optical sheet 30 is placed on the vertexes of a plurality of studs 50 erected on a front surface 40S of the reflection substrate 40. Thus, the optical sheet 30 is disposed to face the reflection substrate 40 so that the plurality of light sources 10 are commonly covered. The front surface 40S and a rear surface 30S of the optical sheet 30 are held by the plurality of stubs 50 at a given distance L4. The wavelength conversion units 20 are disposed between the light sources 10 and the optical sheet 30 in the Z direction. The wavelength conversion units 20 are disposed to occupy regions corresponding to the plurality of light sources 10 on the XY plane, respectively.

In the present specification, a distance direction of the optical sheet 30 and the reflection substrate 40 is referred to as a Z direction (anteroposterior direction). A horizontal direction and a vertical direction on main surfaces (largest surface) of the optical sheet 30 and the reflection substrate 40 are referred to as an X direction and a direction, respectively.

The light source 10 is a point light source and is specifically configured to include a light-emitting diode (LED). For example, the light source 10 faces a rear surface 20S2 (FIG. 2B) of the wavelength conversion unit 20.

Figure 3:
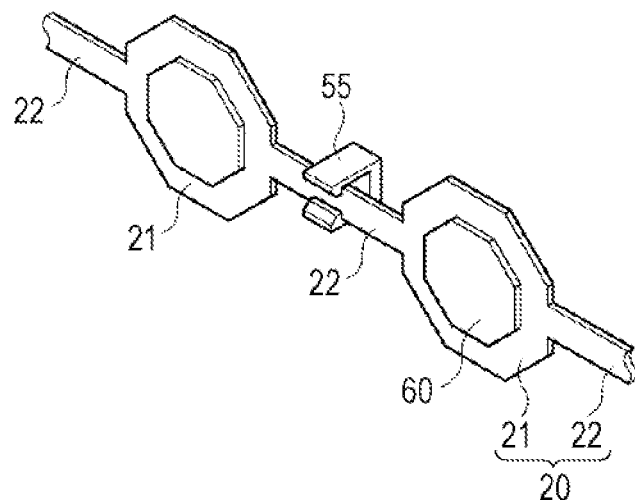
FIG. 3 is an expanded perspective view illustrating a wavelength conversion unit of the light-emitting device illustrated in FIG. 1.
Figure 4:
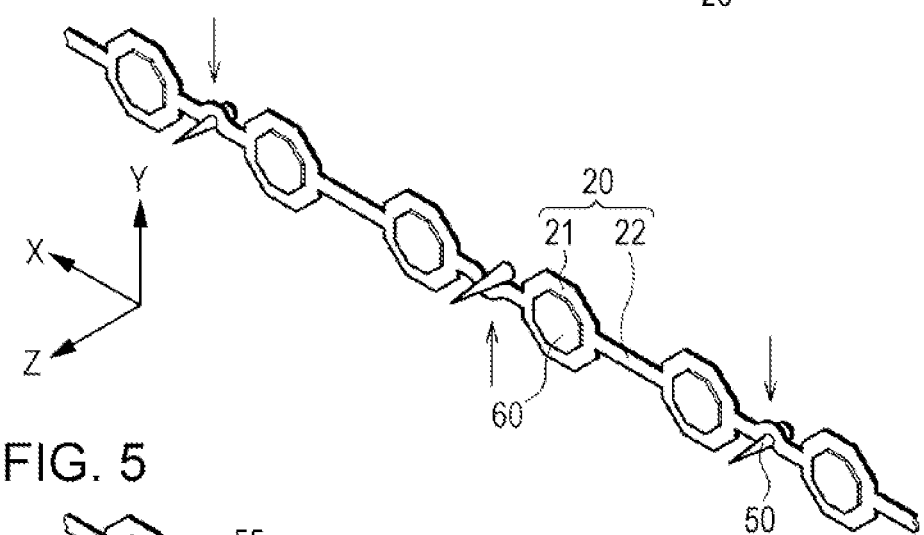
FIG. 4 is a perspective view illustrating a FIG. 4 configuration of a holding mechanism of the wavelength conversion unit of the light-emitting device illustrated in FIG. 1.
Figure 5:
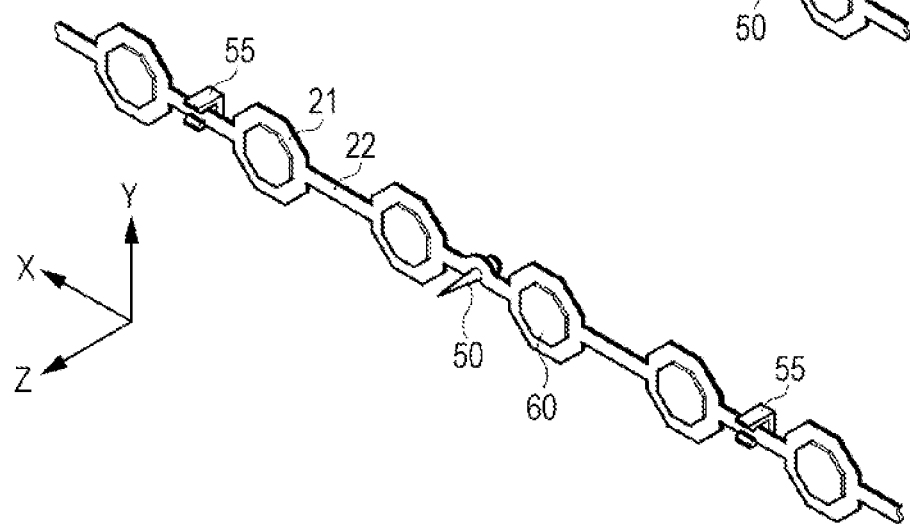
FIG. 5 is a perspective view illustrating another configuration of the holding mechanism of the wavelength conversion unit of the light-emitting device illustrated in FIG. 1.

The wavelength conversion units 20 are disposed between the light source 10 and the optical sheet 30 so that, for example, chromogenic characteristics are improved by converting the wavelength of light from the light sources 10 and emitting converted light. The wavelength conversion units 20 each include a direct upper portion 21 that covers a region (direct upper region) corresponding to each light source 10 and a region of the periphery thereof and a connection portion 22 that connects the direct upper portions 21 mutually adjacent in, for example, the X direction, and thus entirely extend in the X direction. The plurality of wavelength conversion units 20 are arranged in the Y direction. For example, the connection portion 22 is inserted into a slit 54 between a pedestal 52 and a pressure 53 formed in a midslope portion of a pillar 51 of the stud 50 to be held. Alternatively, as expanded and illustrated in FIG. 3, the wavelength conversion unit 20 may be fixed by allowing a clip 55 to grip the connection portion 22. In this configuration, a distance L1 between the rear surface 20S2 of the wavelength conversion unit 20 and the light source 10 is maintained constantly. In FIGS. 1, 2A, and 2B, an insertion direction of the connection portion 22 into the slit 54 is assumed to be the −Y direction, but an embodiment of the present disclosure is not limited thereto. For example, as illustrated in FIG. 4, the connection portions 22 inserted into the slit 54 in the +Y direction and the connection portions 22 inserted into the slits 54 in the −Y direction may be alternately disposed. Alternatively, for example, as illustrated in FIG. 5, the connection portions 22 inserted into the slits 54 and the connection portions 22 gripped by the clips 55 may be alternately disposed. It may not be necessary to hold all of the plurality of existing connection portions 22 by the slits 54 or the clips 55.

The distance L1 between the light source 10 and the wavelength conversion unit 20 is preferably shorter than a distance L3 between the optical sheet 30 and the wavelength conversion unit 20 in the Z direction. This is because a more uniform luminance distribution can be obtained compared to a case in which the distance L1 is equal to or greater than the distance L3. That is, when the wavelength conversion unit 20 is close to the optical sheet 30, the contour of the wavelength conversion unit 20 may be projected to the optical sheet 30, and thus there is a concern of the contour of the wavelength conversion unit 20 being viewed from the outside.

In the embodiment, the example in which the wavelength conversion unit 20 is installed as an integrated object in which the direct upper portion 21 and the connection portion 22 are formed of the same material has been described. However, the connection portion 22 may be formed of a material different from that of the direct upper portion 21, e.g., a resin which does not perform wavelength conversion. Here, a width W22 of the connection portion 22 is preferably narrower than a width W21 of the direct upper portion 21 (see FIG. 2A). This is because an amount of used material is reduced, and thus there are advantages of reducing cost and reducing a weight.

The wavelength conversion unit 20 includes a fluorescent body (fluorescent substance) such as fluorescent pigment or fluorescent dye or a light-emitter, such as a quantum dot, having a wavelength conversion action. The wavelength conversion unit 20 may be obtained by processing a resin including such a fluorescent substance or a light emitter in a sheet shape or may be printed in a predetermined region on another transparent substrate. Alternatively, the wavelength conversion unit 20 may be obtained by sealing a layer of a fluorescent substance or a fluorescent body between two transparent films.

The wavelength conversion unit 20 is excited by light with a first wavelength coming from the light source 10 and incident from the rear surface 20S2, performs wavelength conversion by a principle of fluorescence emission, and emits light with a wavelength (second wavelength) different from the first wavelength from a front surface 20S1. The first and second wavelengths are not particularly limited. However, for example, when the light is used for a display device, the light with the first wavelength may be blue light (for example, a wavelength of about 440 nm to about 460 nm) and the light with the second wavelength may be red light (for example, a wavelength of 620 nm to 750 nm) or green light (for example, a wavelength of 495 nm to 570 nm). That is, the light source 10 is a blue light source. In this case, the wavelength conversion unit 20 converts the wavelength of the blue light into the wavelength of the red light or green light.

The wavelength conversion unit 20 preferably includes a quantum dot. The quantum dot is a particle with a major diameter of about 1 nm to about 100 nm and has a discrete energy level. Since the energy state of the quantum dot depends on the size of the quantum dot, it is possible to select a light-emitting wavelength freely by changing the size of the quantum dot. The color of light emitted from the quantum dot has a narrow spectrum width. A color gamut is expanded by combining light with such steep peaks. Accordingly by using the quantum dot as a wavelength conversion substance, it is possible to expand the color gamut easily. The quantum dot has high responsiveness and the light of the light source 10 can be efficiently used. The quantum dot has high stability. The quantum dot is, for example, a compound of a group 12 element and a group 16 element, a compound of a group 13 element and a group 16 element, or a compound of a group 14 element and a group 16 element and is, for example, CdSe, CdTe, ZnS, CdS, Pds, PbSe, or CdHgTe.

The central point of the direct upper portion 21 of the wavelength conversion unit 20 is identical to an optical axis CL of the light source 10 on the XY plane (see FIG. 2A). In this case, the direct upper portion 21 may be disposed at a position in which a condition expression (1) below is satisfied. This is because a component with high energy intensity in the light from the light source 10 is prevented from being incident directly on the optical sheet 30 and luminance irregularity is sufficiently reduced.

$$|\theta 1| < \text{Tan}^{-1}(R1/L1) \quad (1)$$

Figure 6:
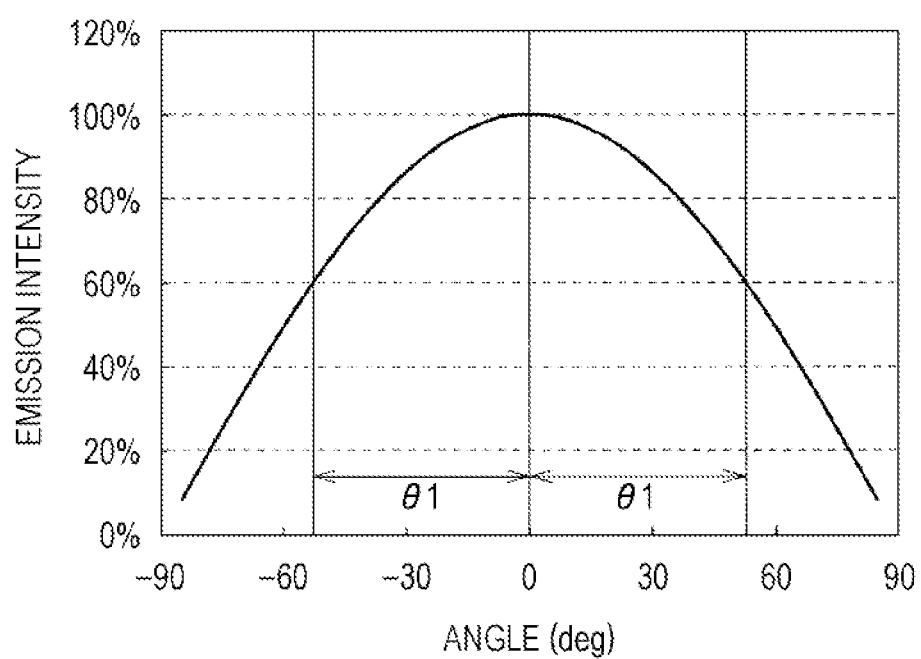
FIG. 6 is a characteristic diagram illustrating a relation between emission intensity of a light source and an angle with respect to an optical axis in the light-emitting device illustrated in FIG. 1.
Figure 7:
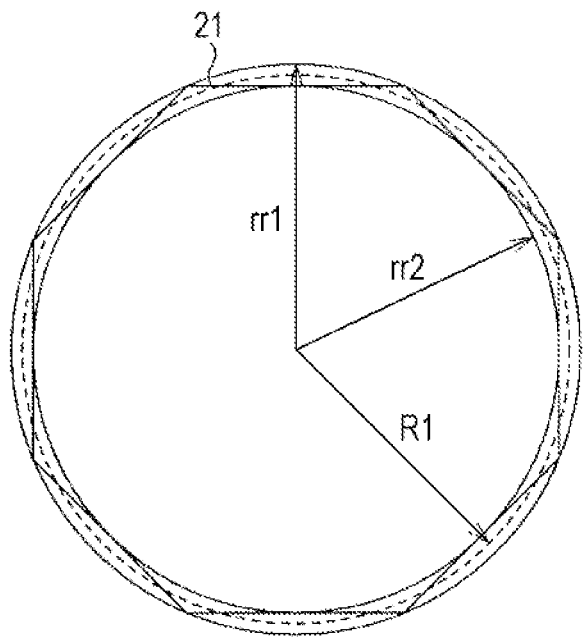
FIG. 7 is an explanatory diagram illustrating a method of regulating a radius of the wavelength conversion unit of the light-emitting device illustrated in FIG. 1.

Here, θ1 is an angle at which the emission intensity of the light source 10 is 60% of the maximum peak (where an optical axis direction is assumed to be 0°) (see FIG. 6). R1 is a radius obtained as a median value of circumradius rr1 and an inradius rr2 in the direct upper portion 21 of the wavelength conversion unit 20 (see FIG. 7). L1 is a distance between the light source 10 and the wavelength conversion unit 20 in the Z direction.

The reflection substrate 40 is a plate-shaped or a sheet-shaped member installed to face the rear surface 20S2 of the wavelength conversion unit 20. The reflection substrate 40 returns, to the wavelength conversion unit 20 or the optical sheet 30, light emitted from the light source 10, reaching the wavelength conversion unit 20, and then returned from a light reflection member 60 (described below) or light emitted from the light source 10, reaching the optical sheet 30, and then returned from the optical sheet 30. The reflection substrate 40 has a function of, for example, reflection, diffusion, or dispersion, and thus can improve front luminance by efficiently using the light from the light source 10.

The reflection substrate 40 is formed of, for example, a foaming polyethylene-telephthalate (PET), a silver-vaporized film, a multilayer reflection film, or a white PET. When the reflection substrate 40 has a specular reflection (mirror reflection) function, the front surface of the reflection substrate 40 is preferably subjected to silver evaporation, aluminum evaporation, a multilayer reflection process, or the like. When the reflection substrate 40 is vested with a minute shape, the reflection substrate 40 may be integrally formed by a method such as molten extrusion molding or heat press molding using a thermoplastic resin or may be formed by applying an energy ray (for example, an ultraviolet ray) curing resin onto a substrate formed of, for example, PET and then transferring a shape to the energy ray curing resin. Here, examples of the thermoplastic resin include a polycarbonate resin, an acrylic resin such as a polymethyl methacrylate resin (PMMA), a polyester resin such as polyethylene telephthalate, an amorphous copolymer polyester resin such as methylmethacrylate styrene copolymer (MS), polystyrene resin, and polyvinylchloride resin. When a shape is transferred to the energy ray (for example, an ultraviolet ray) curing resin, the substrate may be glass.

The light-emitting device 1 may further include, for example, four wall portions 41 that are erected in the outer edge of the reflection substrate 40 and surround the plurality of light sources 10 and wavelength conversion units 20 from four sides. The inner surface of the wall portion 41 has a reflection function and an auxiliary wavelength conversion unit 42 is installed in a part of the wall portion 41. The wavelength conversion unit 42 is formed of, for example, the same material as the wavelength conversion unit 20 and is a belt-like member that is formed in the inner surface of the wall portion 41 and extends in the X direction and the Y direction. The wavelength conversion unit 42 has a wavelength conversion function as in the wavelength conversion unit 20 and supplements the function of the main wavelength conversion unit 20.

The optical sheet 30 is installed to face the front surface 20S1 of the wavelength conversion unit 20 and includes, for example, a diffusion plate, a diffusion sheet, a lens film, and a polarization separation sheet. In FIGS. 1 and 2B, only one optical sheet 30 is illustrated among the plurality of optical sheets 30. By installing the optical sheet 30, it is possible to launch light emitted from the light source 10 or the wavelength conversion unit 20 in an inclination direction in the front direction, and thus it is possible to further improve the front luminance.

The light-emitting device 1 further includes the light reflection members 60 that reflect light transmitted through the direct upper portion 21 of the wavelength conversion unit 20. The light reflection members 60 are disposed in regions corresponding to the plurality of light sources 10 on the XY plane, respectively. In the embodiment, the case in which the light reflection members 60 are disposed to come into contact with the front surface 20S1 has been described. However, the light reflection members 60 may be separated from the front surface 20S1 when the light reflection members 60 are disposed between the direct upper portions 21 and the optical sheet 30.

The central point of the light reflection member 60 is identical to the optical axis CL of the light source 10 on the XY plane (see FIG. 2A). In this case, the light reflection member 60 may be disposed at a position in which a condition expression (2) and a condition expression (3) below are satisfied. This is because a region in which light transmitted through the direct upper portion 21 from the light source 10 and incident directly on the optical sheet 30 is blocked by the light reflection member 60 is restricted with an appropriate size and it is difficult to view a dark portion occurring by disposing the light reflection member 60. Accordingly, the luminance irregularity is further reduced.

$$\operatorname{Tan}^{-1}(R2/L2) < 27° \tag{2}$$

$$R2 < R1 \tag{3}$$

Figure 8:
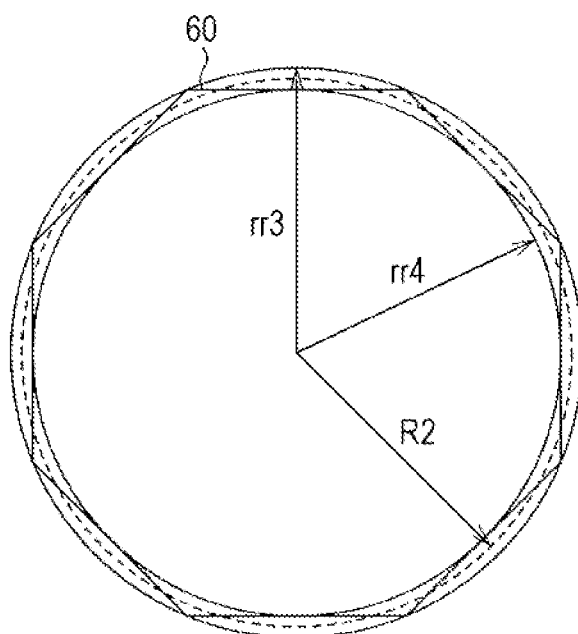
FIG. 8 is an explanatory diagram illustrating a method of regulating the radius of the light reflection member of the light-emitting device illustrated in FIG. 1.

Here, R2 is a radius obtained as a median value of a circumradius rr3 and an inradius rr4 in the light reflection member 60 (see FIG. 8). L2 is a distance between the light reflection member 60 and the optical sheet 30 in the Z direction.

Operations and Advantages of Light-Emitting Device 1

In the light-emitting device 1, the light source 10 is a point light source. Therefore, the light emitted from the light source 10 is spread from the light emission center of the light source 10 in all of the 360° directions, passes through the optical sheet 30, and is finally observed as emitted light. Specifically, optical path modes are classified into three optical path modes.

Figure 9A:
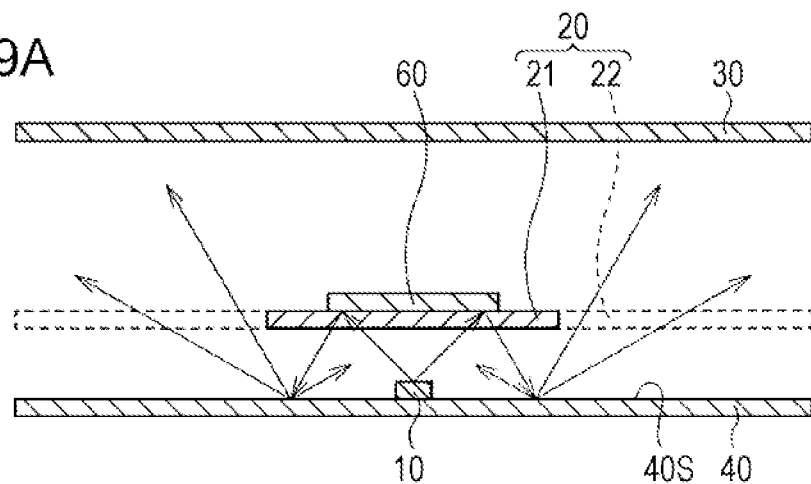
FIG. 9A is an explanatory diagram illustrating a first optical path mode in the light-emitting device illustrated in FIG. 1.

For example, as illustrated in FIG. 9A, a first optical path mode is a mode in which light emitted from the light source 10 is incident on a region of the direct upper portion 21 of the wavelength conversion unit 20 superimposed on the light reflection member 60. In this case, after the light from the light source 10 is subjected to the wavelength conversion by the direct upper portion 21 of the wavelength conversion unit 20, the light is reflected from the light reflection member 60. The reflected light from the light reflection member 60 receives an action of reflection, diffusion, dispersion, or the like on the front surface 40S of the reflection substrate 40 and is oriented toward the wavelength conversion unit 20 or the optical sheet 30.

Figure 9B:
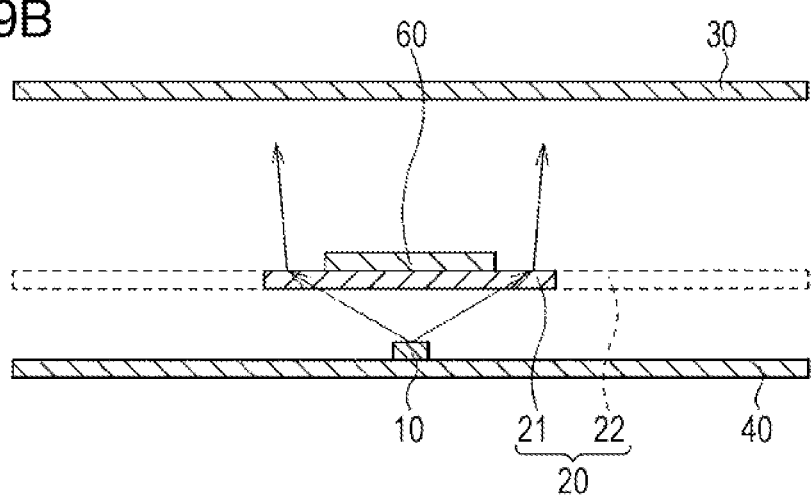
FIG. 9B is an explanatory diagram illustrating a second optical path mode in the light-emitting device illustrated in FIG. 1.

For example, as illustrated in FIG. 9B, a second optical path mode is a mode in which light emitted from the light source 10 is incident on a region other than the region of the direct upper portion 21 of the wavelength conversion unit 20 superimposed on the light reflection member 60. In this case, after the light from the light source 10 is subjected to the wavelength conversion by the direct upper portion 21 of the wavelength conversion unit 20, the light passes through the vicinity of the light reflection member 60 and is oriented toward the optical sheet 30.

Figure 9C:
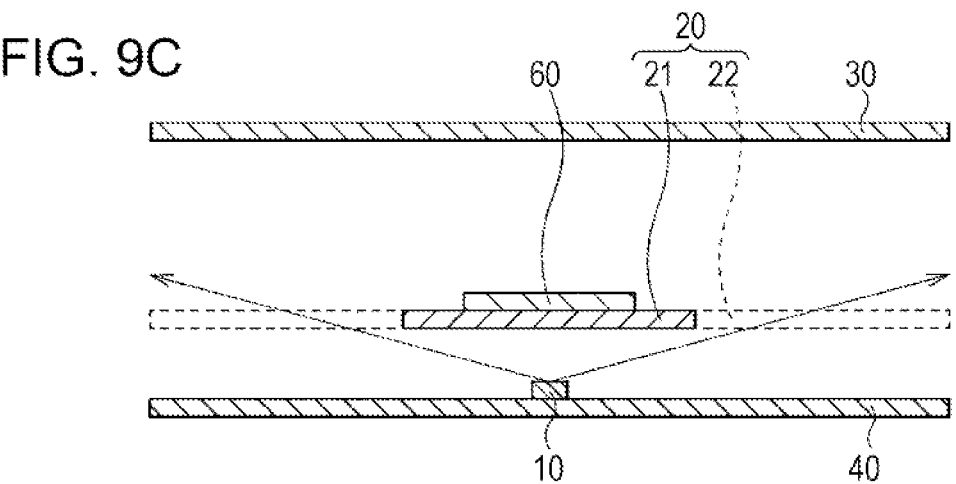
FIG. 9C is an explanatory diagram illustrating a third optical path mode in the light-emitting device illustrated in FIG. 1.

For example, as illustrated in FIG. 9C, a third optical path mode is a mode in which light emitted from the light source 10 does not pass the direct upper portion 21 of the wavelength conversion unit 20 and is incident directly on the optical sheet 30. In this case, the light from the light source 10 is not subjected to the wavelength conversion to remain as, for example, blue light, and is oriented toward the optical sheet 30.

In the light-emitting device 1 according to the embodiment, the direct upper portions 21 of the plurality of wavelength conversion units 20 are disposed between the light sources 10 and the optical sheet 30 in the Z direction and are disposed in the regions corresponding to the plurality of light sources 10 on the XY plane, respectively. Thus, it is possible to appropriately perform the wavelength conversion to the light with the second wavelength (for example, green light or red light) while reducing the intensity of the light with the first wavelength incident directly on the optical sheet 30 from the light source 10. Further, an amount of used constituent material can be reduced compared to a case in which one sheet-shaped wavelength conversion member is installed across the entire surface. Accordingly, in the light-emitting device 1, it is possible to reduce the weight and it is possible to efficiently emit light for which luminance irregularity or color deviation on the XY plane is small.

Since the light reflection member 60 is installed above the direct upper portion 21 of the wavelength conversion unit 20, flatness of light emission intensity from the optical sheet 30 is improved. This is because the light coming from the light source 10 and transmitted through the direct upper portion 21 is not incident directly on the optical sheet 30, but the light can be reflected from the light reflection member 60, can be reflected again from the reflection substrate 40, and then can be guided toward the optical sheet 30.

Second Embodiment

Configuration of Light-Emitting Device 2

Figure 10:
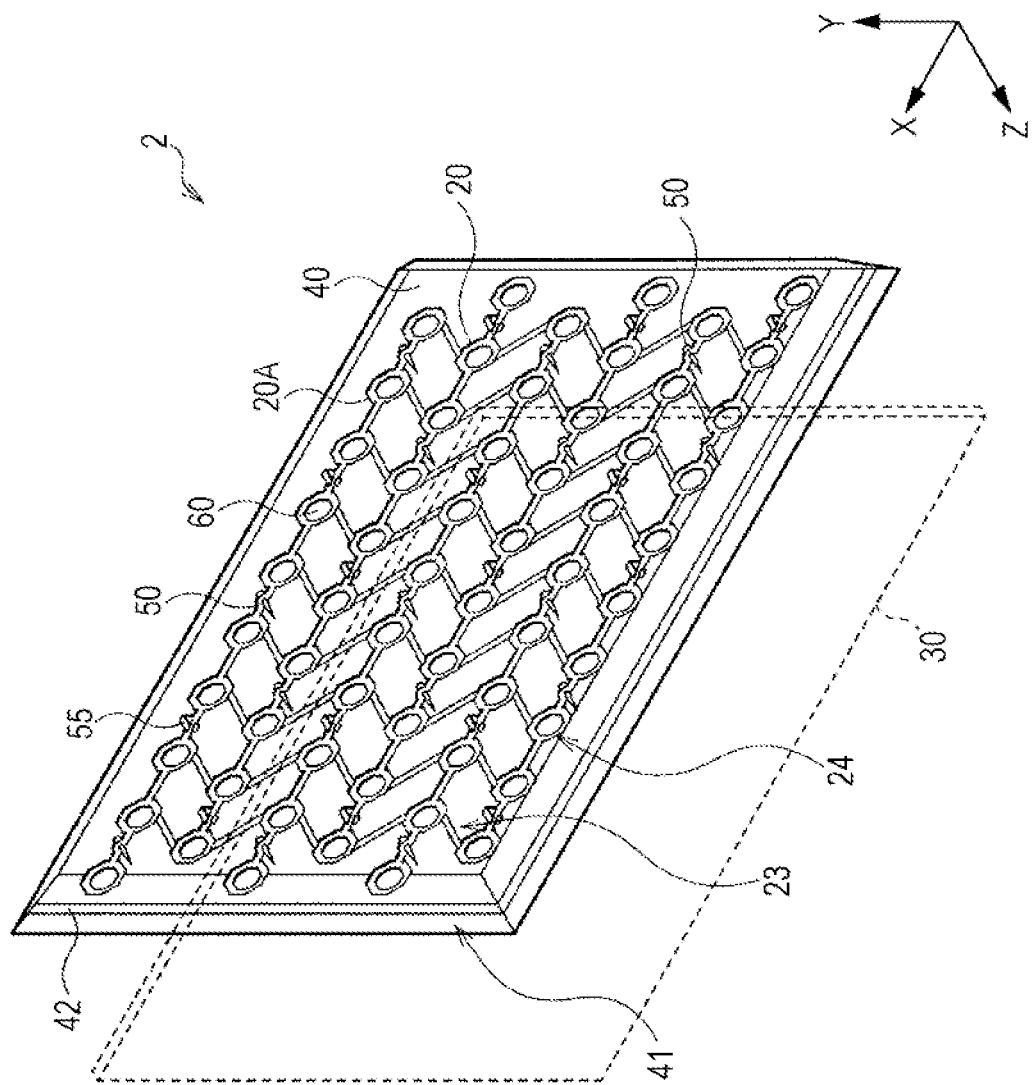
FIG. 10 is a perspective view illustrating the entire configuration of a light-emitting device according to a second embodiment of the present disclosure.

FIG. 10 is a perspective view illustrating the entire configuration of a light-emitting device 2 according to a second embodiment of the present disclosure. The light-emitting device 2 has the same configuration as the light-emitting device 1 according to the foregoing first embodiment except that one wavelength conversion unit 20A is included instead of the plurality of wavelength conversion units 20.

The wavelength conversion unit 20A has a plurality of openings 23 or notches 24 selectively formed in regions other than the regions corresponding to the plurality of light sources 10, respectively. In the wavelength conversion unit 20A, the mutually adjacent direct upper portions 21 are connected to each other by the connection portions 22, as in the wavelength conversion unit 20. The wavelength conversion unit 20A is different from the wavelength conversion unit 20 in that not only the direct upper portions 21 arranged in the X direction but also the direct upper portions 21 arranged in the Y direction are connected by the connection portions 22.

Operations and Advantages of Light-Emitting Device 2

The light-emitting device 2 has the same functions as those of the light-emitting device 1 according to the foregoing first embodiment. The number of components is reduced and an assembly operation is simplified.

Third Embodiment

Configuration of Light-Emitting Device 3

Figure 11A:
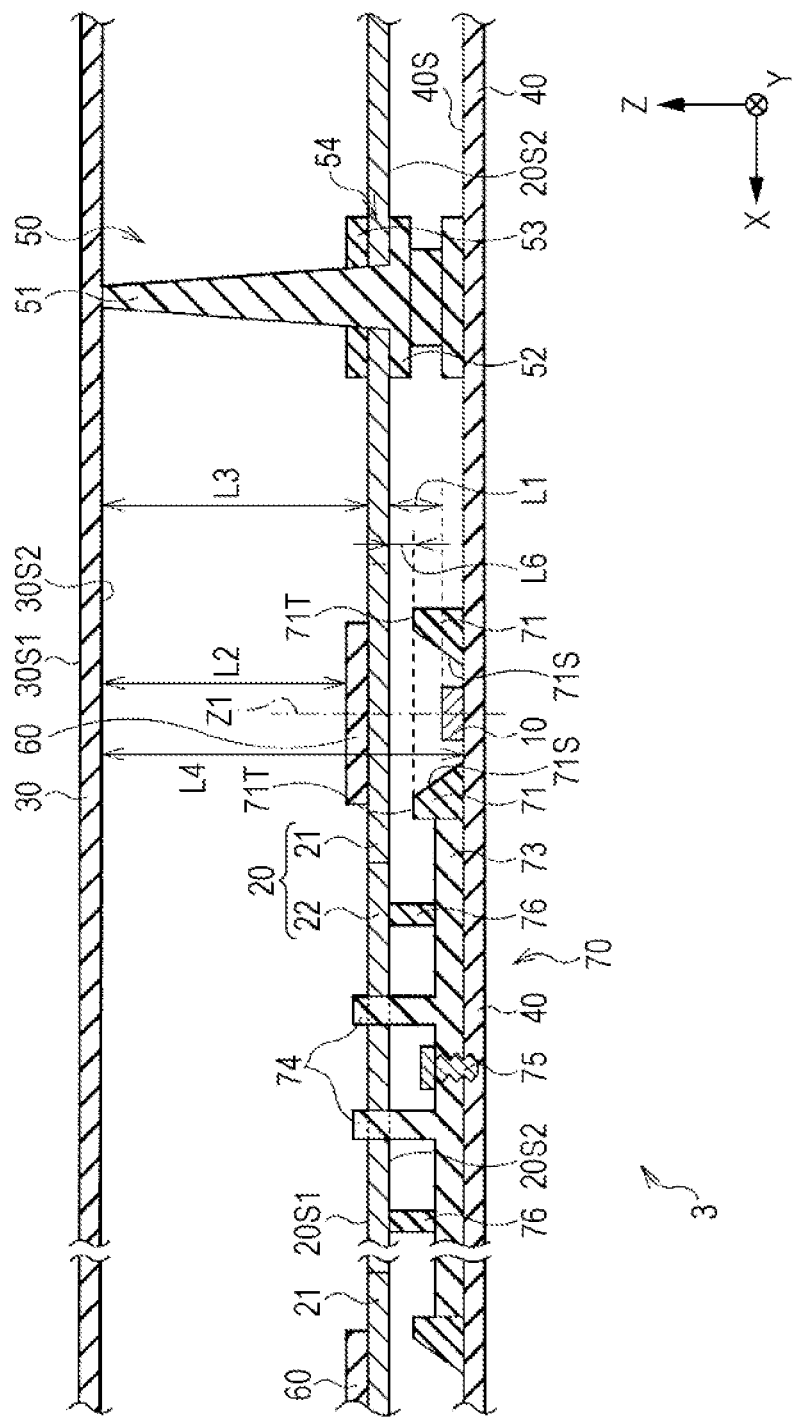
FIG. 11A is a sectional view illustrating the configuration of units of a light-emitting device according to a third embodiment of the present disclosure.
Figure 11B:
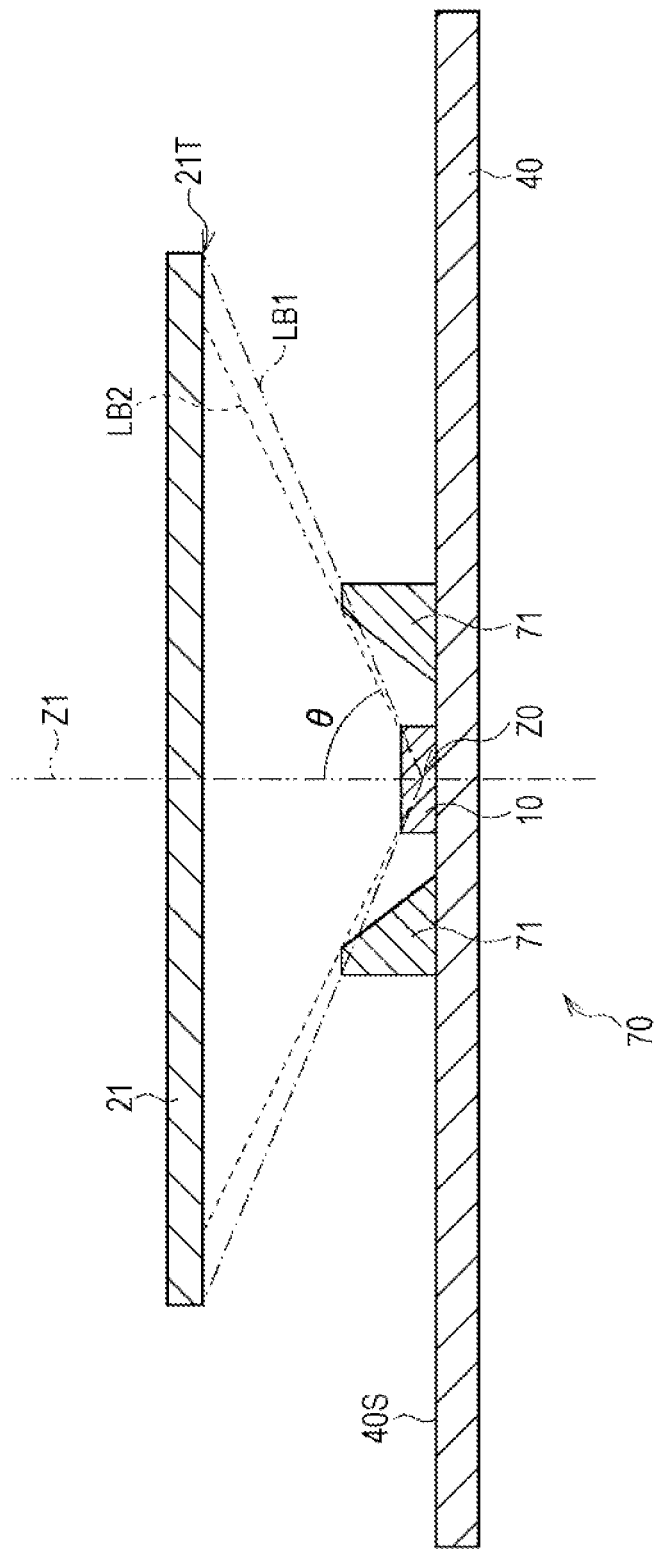
FIG. 11B is an expanded sectional view illustrating a light source and the vicinity of the light source of the light-emitting device illustrated in FIG. 11A.
Figure 11C:
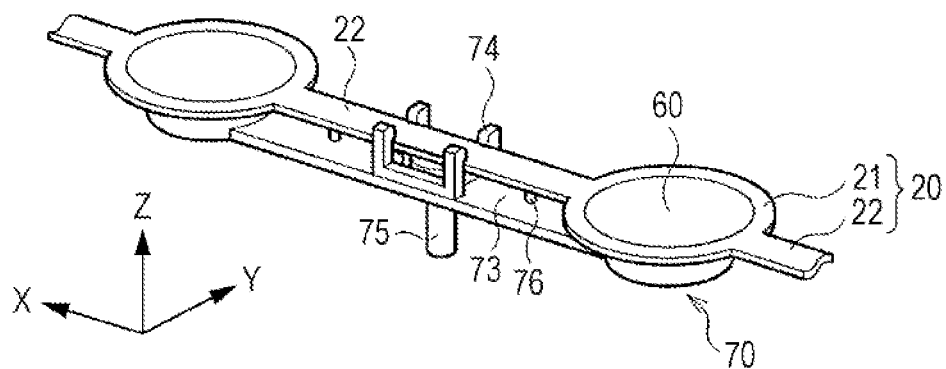
FIG. 11C is a perspective view illustrating a configuration of main units of the light-emitting device illustrated in FIG. 11A.
Figure 11D:
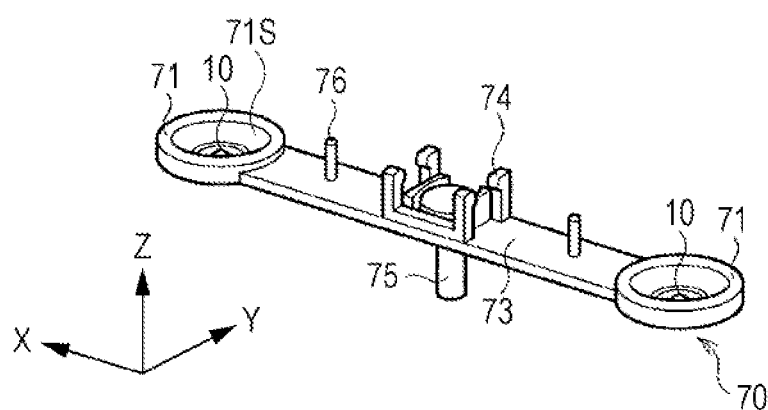
FIG. 11D is a perspective view illustrating another configuration of the main units of the light-emitting device illustrated in FIG. 11A.

FIG. 11A is a sectional view illustrating the configuration of main units of a light-emitting device 3 according to a third embodiment of the present disclosure. FIG. 11B is an expanded diagram illustrating the main units of the light-emitting device 3. FIGS. 11C and 11D are perspective views illustrating the configuration of the main units of the light-emitting device 3. In FIG. 11D, the wavelength conversion unit 20 and the light reflection member 60 are not illustrated. The light-emitting device 3 has the same configuration as the light-emitting device 1 according to the foregoing first embodiment except that a plurality of light-shielding members 70 are included on the reflection substrate 40.

Figure 11E:
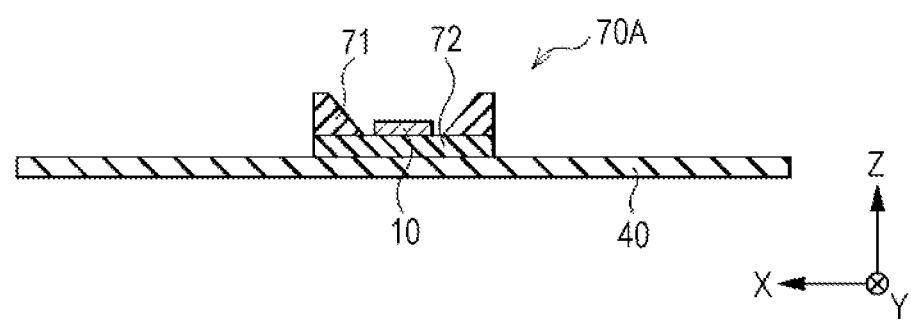
FIG. 11E is a sectional view illustrating a first modification example of a light-shielding member illustrated in FIG. 11A.

Each light-shielding member 70 includes a wall portion 71 erected on the front surface 40S of the reflection substrate 40 to surround each light source 10 in a plane intersecting (for example, perpendicular to) an optical axis Z1 of each light source 10. The wall portion 71 may be fixed directly to the front surface 40S. For example, as in a light-shielding member 70A illustrated in FIG. 11E in a first modification example, the wall portion 71 may be installed along with the light source 10 on a base portion 72 on a flat plate.

The rear surface 20S2 of the wavelength conversion unit 20 and a top surface 71T of the light-shielding member 70 may be separated from each other by a distance L6 (see FIG. 11A). This is because when the wavelength conversion unit 20 comes into contact with the light-shielding member 70, there is a concern of heat generated in the light source 10 not being sufficiently radiated to the outside and overheating occurring in the light source 10 and the vicinity of the light source 10. For example, the distance L6 may be equal to or greater than ⅓ of a distance between the rear surface 20S2 and the front surface 40S. This is because the light emitted from the light source 10 is emitted to the outside without being confined between the wavelength conversion unit 20 and the light-shielding member 70, and thus light emission efficiency is improved.

Figure 11F:
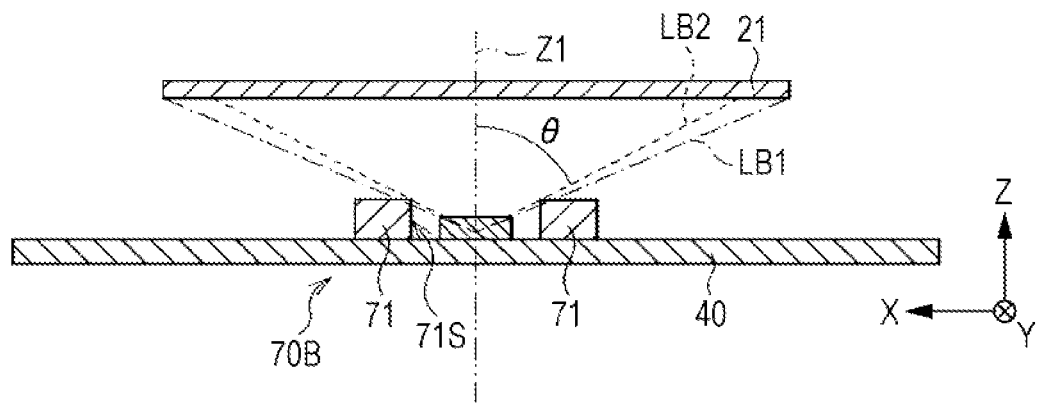
FIG. 11F is a sectional view illustrating a second modification example of the light-shielding member illustrated in FIG. 11A.
Figure 11G:
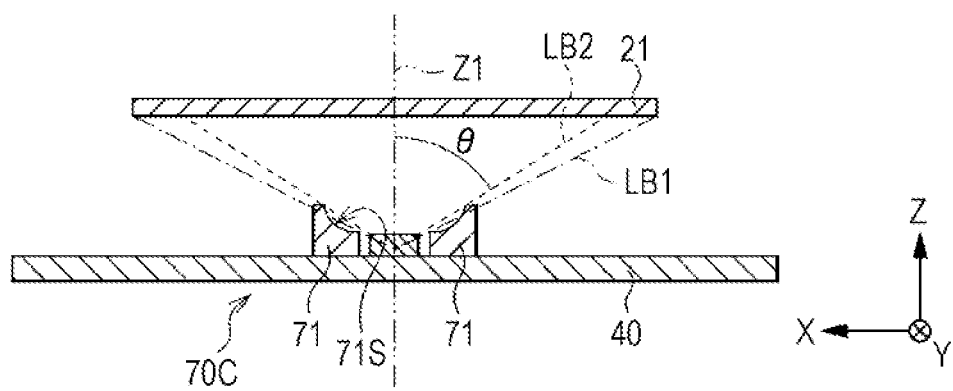
FIG. 11G is a sectional view illustrating a third modification example of the light-shielding member illustrated in FIG. 11A.
Figure 11H:
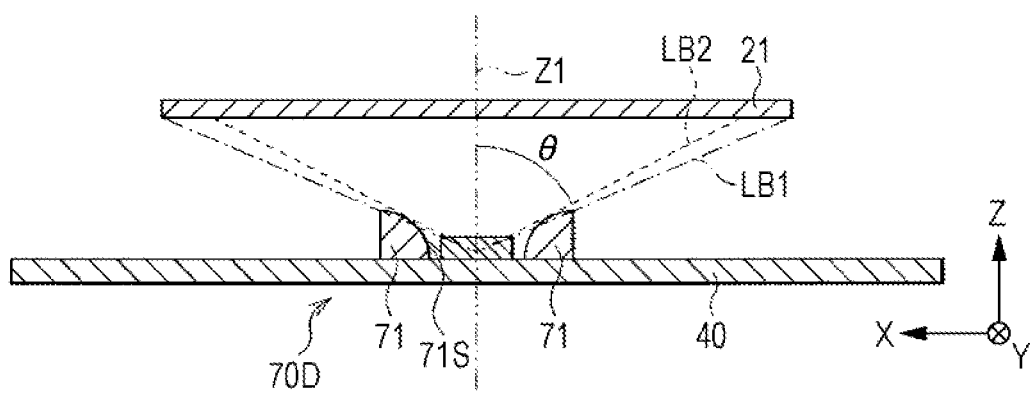
FIG. 11H is a sectional view illustrating a fourth modification example of the light-shielding member illustrated in FIG. 11A.

For example, surface 71S of the wall portion 71 facing the light source 10 is inclined to be more distant from the light source 10 as the inner surface 71S is closer from the front surface 40S to the wavelength conversion unit 20. However, as in a light-shielding member 70B illustrated in FIG. 11F in a second modification example, for example, the inner surface 71S may be perpendicular to the XY plane along the front surface 40S of the reflection substrate 40. As in a light-shielding member 70C illustrated in FIG. 11G in a third modification example, for example, the inner surface 71S may be a concave surface. As in a light-shielding member 70D illustrated in FIG. 11H in a fourth modification example, for example, the inner surface 71S may be a convex surface. When the inner surface 71S is a concave surface as in the light-shielding member 70C, most of the light emitted from the light source 10 is introduced to the direct upper portion 21 of the wavelength conversion unit 20 located in a direct upward direction. On the other hand, when the inner surface 71S is a convex surface as in the light-shielding member 70D, most of the light emitted from the light source 10 is reflected upward obliquely rather than in the direct upward direction. Accordingly, even when the distance L6 is short, the light emitted from the light source 10 can be extracted efficiently from a gap between the wavelength conversion unit 20 and the light-shielding member 70.

In the light-emitting device 3, as illustrated in FIG. 11B, a part of the wall portion 71 erected on the front surface 40S may reach a straight line LB1 joining a light emission point Z0 of the light source 10 formed on the front surface 40S and an end 21T of the direct upper portion 21. In this case, of the light emitted from the light emission point Z0 and travelling without being blocked by the wall portion 71 of the light-shielding member 70, a light beam LB2 for which an emitting angle θ with respect to the optical axis Z1 is the maximum is incident on the direct upper portion 21. Therefore, of the light emitted from the light emission point Z0, all of the light travelling without being blocked by the wall portion 71 is incident on the direct upper portion 21. The light blocked by the wall portion 71 is absorbed to the wall portion 71 to become heat or is reflected from the inner surface 71S of the wall portion 71. Accordingly, the light from the light source 10 is reliably prevented from being incident directly on the optical sheet 30 without being subjected to the wavelength conversion by the wavelength conversion unit 20. Since the inner surface 71S is inclined toward the direct upper portion 21, most of the light reflected from the inner surface 71S is incident on the direct upper portion 21 and contributes to an improvement in the luminance of the light-emitting device 3. To promote reuse of the light, the wall portion 71 may be formed of, for example, a high-reflection material such as white polycarbonate. In the above-described light-shielding members 70B to 70D in the second to fourth modification examples, a part of the wall portion 71 erected on the front surface 40S may reach the straight line LB1 joining the light emission point 20 of the light source 10 and the end 21T of the direct upper portion 21.

The light-emitting device 3 may further include connection portions 73 connecting two or more of the light-shielding members 70. In this case, the light-shielding member 70 and the connection portion 73 may be an integrated object formed of the same material. In this case, the number of components can be reduced. The connection portion 73 is fixed to the reflection substrate 40 by, for example, a screw 75. Both of the connection portions 22 and 73 extend in, for example, the X-axis direction and have parts overlapping each other in the thickness direction (Z-axis direction). A clip 74 gripping the connection portion 22 may be installed in the connection portion 73. Between the connection portions 22 and 73, for example, a columnar spacer 76 may be erected on the connection portion 73. This is because the distance L1 between the direct upper portion 21 and the light source 10 and the distance L6 between the direct upper portion 21 and the top surface 71T of the wall portion 71 are each maintained regularly in the plane since the connection portions 22 and 73 are maintained at a more regular interval in the plane. The spacer 76 may be formed as an integrated object with the connection portion 73.
Operations and Advantages of Light-Emitting Device 3

Figure 11I:
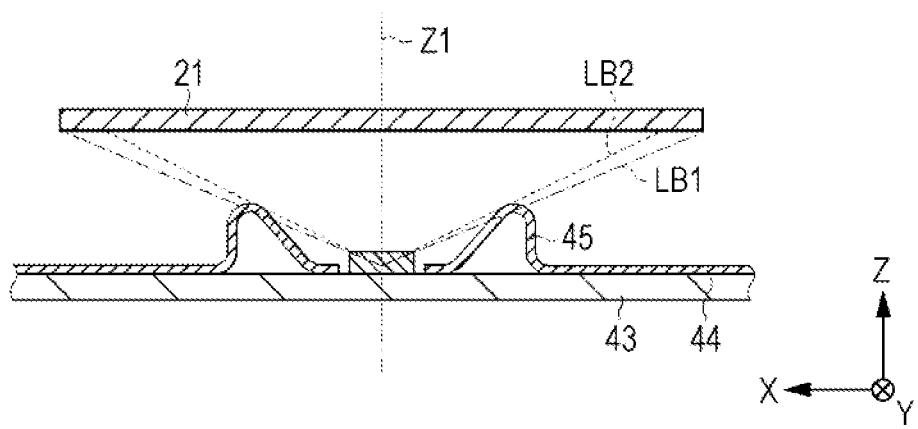
FIG. 11I is a sectional view illustrating a first modification example of the light-emitting device illustrated in FIG. 11A.
Figure 11J:
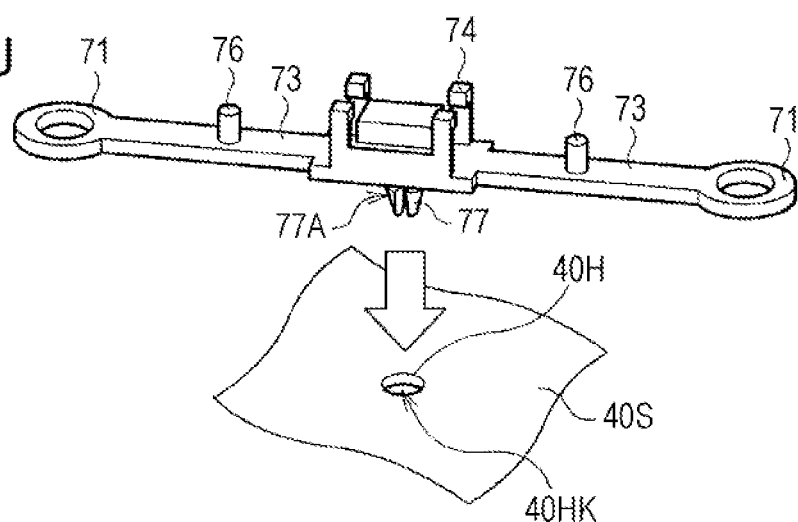
FIG. 11J is a perspective view illustrating a second modification example of the light-emitting device illustrated in FIG. 11A.
Figure 11K:
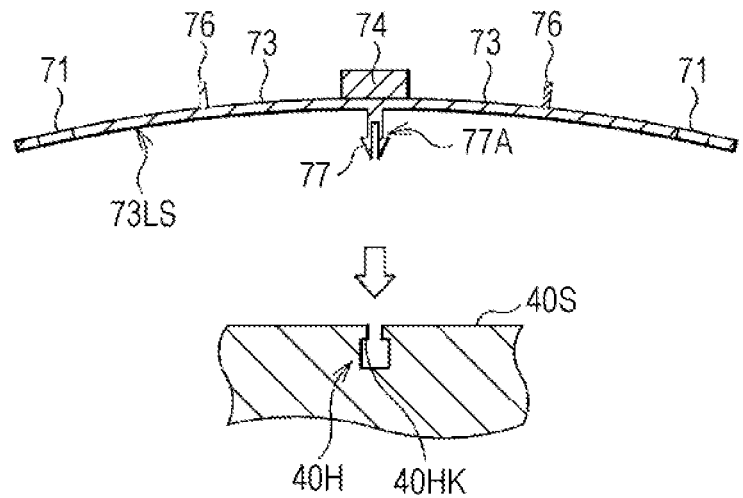
FIG. 11K is a sectional view illustrating the second modification example of the light-emitting device illustrated in FIG. 11A.

In the light-emitting device 3, the plurality of light-shielding members 70 including the wall portions 71 erected to surround the light sources 10 are installed. Therefore, of the light from the light source the 10, component incident directly on the optical sheet 30 without being subjected to the wavelength conversion by the wavelength conversion unit 20 is further reduced. In particular, when the part of the direct upper portion 21 of the wavelength conversion unit 20 reaches the straight line LB1 joining the light source 10 and the end 20T, the entire light emitted from the light emission point zo and travelling without being blocked by the wall portion 71 is incident on the direct upper portion 21. In this case, it is possible to reliably prevent the light from the light source 10 from being incident directly on the optical sheet 30 without being subjected to the wavelength conversion by the wavelength conversion unit 20. Accordingly, in the light-emitting device 3, it is possible to further alleviate occurrence of luminance irregularity or color deviation (in particular, irregularity of the blue component) in the plane. For example, the inner surface 71S of the wall portion 71 surrounding the light source 10 is inclined to be more distant from the light source 10 (expanded on the XY plane) as the inner surface 71S is closer from the front surface 40S to the wavelength conversion unit 20. Therefore, it is possible to improve use efficiency of the light from the light source 10.
First Modification Example of Third Embodiment As illustrated in FIG. 11I, a substrate 43 and a reflection sheet 44 disposed thereon may be used instead of the reflection substrate 40. In this case, parts of the reflection sheet 44 may function as light-shielding members. That is, wall portions 45 erected on the substrate 43 are formed by curving the parts of the reflection sheet 44. The wall portions 45 are molded to surround the light source 10 on the XY plane perpendicular to the optical axis Z1. Even in this case, by adjusting the heights of the wall portions 45, the same advantages as those of the foregoing third embodiment are expected.
Second Modification Example of Third Embodiment In the foregoing third embodiment, the connection portion 73 is fixed to the reflection substrate 40 by the screw 75, but a fixing portion is not limited to the screw 75. For example, as in a modification example illustrated in a perspective view of FIG. 11J and a sectional view of FIG. 11K, a protrusion 77 may be formed in the connection portion 73 and the protrusion 77 may be inserted to be fixed to a hole 40H formed in the front surface 40S of the reflection substrate 40. In this case, a claw 77A may be formed in the protrusion 77 and may lock into a locking portion 40HK inside the hole 40H formed in the reflection substrate 40. In this case, the wall portion 71, the connection portion 73, the clip 74, and the protrusion 77 may be integrated. Further, as illustrated in FIG. 11K, the connection portion 73 may be curved so that a lower surface 73LS forms a concave surface. By curving the connection portion 73 in this way, it is possible to prevent the wall portion 71 installed at the end of the connection portion 73 from being away from the front surface 40S when the protrusion 77 is inserted to be fixed to the hole 40H.

Fourth Embodiment

Figure 12:
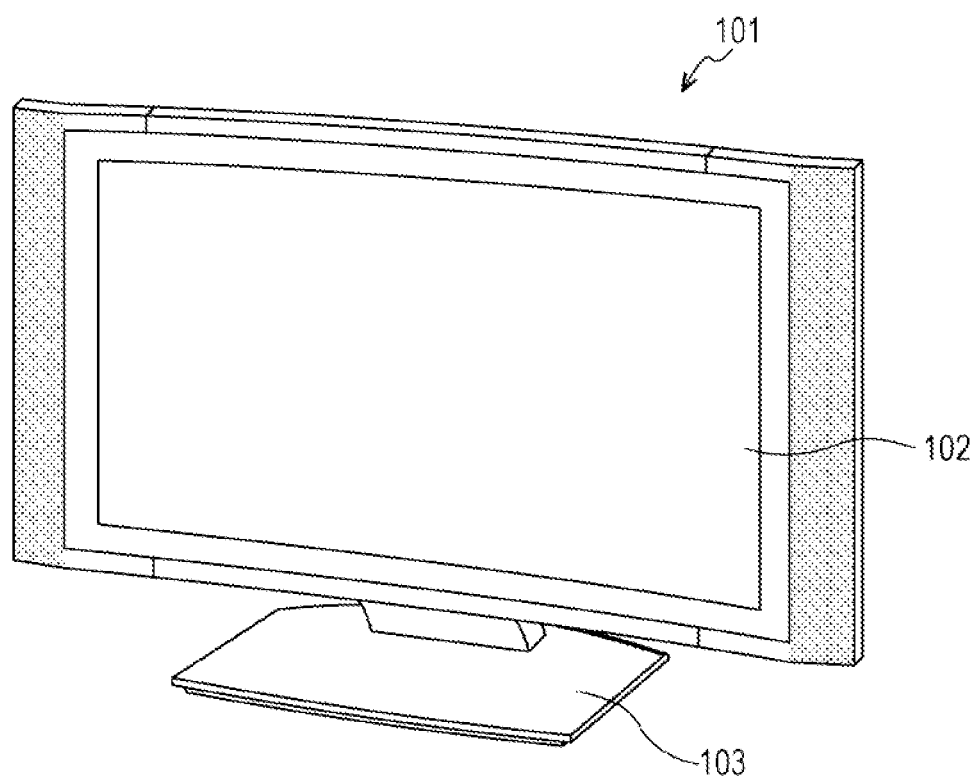
FIG. 12 is a perspective view illustrating the outer appearance of a display device according to a fourth embodiment of the present disclosure.

FIG. 12 is a diagram illustrating the outer appearance of a display device 101 according to a fourth embodiment of the present disclosure. A display device 101 includes the light-emitting device 1 and is used as, for example, a thin type television device. The display device 101 has a configuration in which a body unit 102 with a flat plate shape for image display is supported by a stand 103. The display device 101 is used as a standing type device by attaching the stand 103 to the body unit 102 and placing the stand 103 on the horizontal surface of a floor, a shelf, a rack, or the like in the attached state. However, the display device 101 may also be used as a wall-mounting type device in a state in which the stand 103 is detached from the body unit 102.

FIG. 13A illustrates the exploded body unit 102 illustrated in FIG. 12. The body unit 102 includes, for example, a front outer case member (bezel) 111, a panel module 112, and a rear outer case member (rear cover) 113 in this order from the front side (viewer side). The front outer case member 111 is a frame-shaped member that covers the front circumference of the panel module 112 and a pair of speakers 114 are disposed on the lower side. The panel module 112 is fixed to the front outer case member 111. A power substrate 115 and a signal substrate 116 are mounted on the rear surface of the panel module 112 and a mounting bracket 117 is fixed to the rear surface. The mounting bracket 117 is used for attachment of a wall mounting bracket, attachment of a substrate, and attachment of the stand 103. The rear outer case member 113 covers the rear surface and the side surfaces of the panel module 112.

Figure 13B:
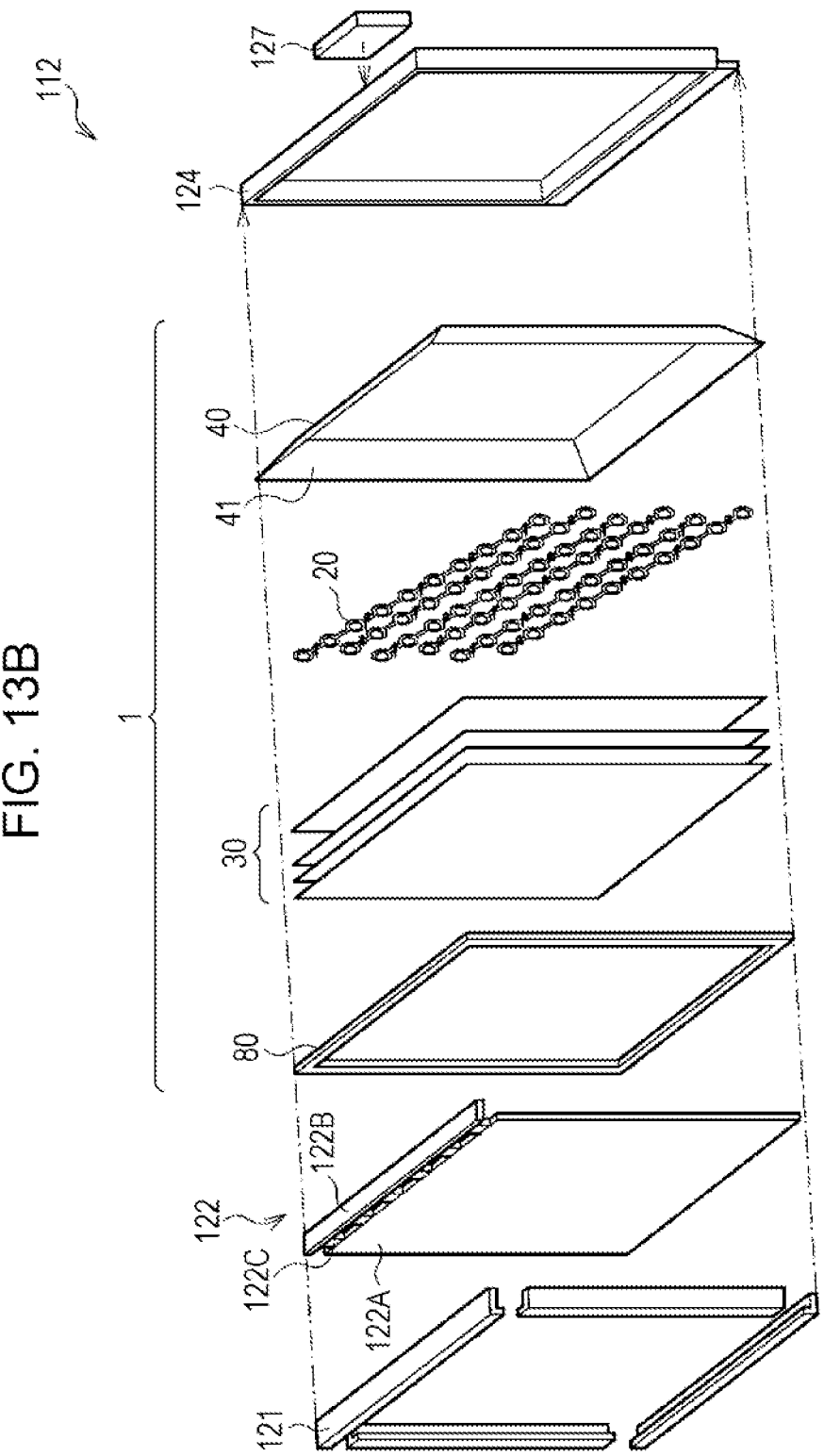
FIG. 13B is an exploded perspective view illustrating a panel module illustrated in FIG. 13A.

FIG. 13B illustrates the exploded panel module 112 illustrated in FIG. 13A. The panel module 112 includes, for example, a front casing (top chassis) 121, a liquid crystal panel 122, a frame-shaped member (middle chassis) 80, the optical sheet 30, the wavelength conversion units 20, the reflection substrate 40, a rear casing (back chassis) 124, and a timing controller substrate 127 in this order from the front side (viewer side).

The front casing 121 is a frame-shaped metal component that covers the front circumference of the liquid crystal panel 122. The liquid crystal panel 122 includes, for example, a liquid crystal cell 122A, a source substrate 122B, and a flexible substrate 122C, such as a chip on film (COF), connecting the liquid crystal cell 122A and the source substrate 122B. The frame-shaped member 80 is a frame-shaped resin component that holds the liquid crystal panel 122 and the optical sheet 30. The rear casing 124 is a metal component that is formed of iron (Fe) and houses the liquid crystal panel 122, an intermediate casing 123, and the light-emitting device 1. The timing controller substrate 127 is also mounted on the rear surface of the rear casing 124.

In the display device 101, the light from the light-emitting device 1 is transmitted selectively by the liquid crystal panel 122 so an image is displayed. Here, as described in the first embodiment, since the display device 101 includes the light-emitting device 1 in which the color regularity in the plane is improved, the display quality of the display device 101 is improved.

In the foregoing embodiment, the case in which the display device 101 includes the light-emitting device 1 according to the first embodiment has been described. However, the display device 101 may include the light-emitting device 2 according to the second embodiment instead of the light-emitting device 1.

Application Examples of Display Device

Hereinafter, application examples of the foregoing display device 101 to electronic apparatuses will be described. Examples of the electronic apparatuses include a television apparatus, a digital camera, a note-type personal computer, a portable terminal such as a mobile phone, and a video camera. In other words, the foregoing display device can be applied to electronic apparatuses displaying video signals input from the outside or video signals generated therein as images or videos in all kinds of fields.

Application Example 1

Figure 14A:
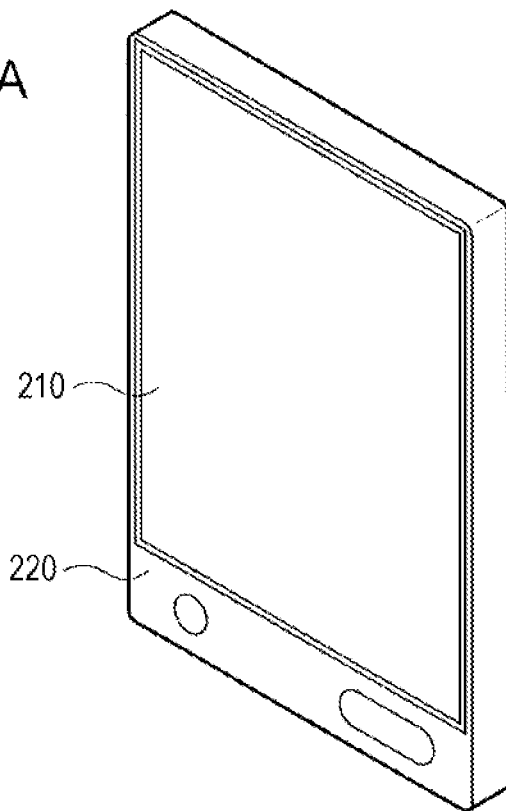
FIG. 14A is a perspective view illustrating the outer appearance of an electronic book (Application Example 1) on which a display device according to an embodiment of the present disclosure is mounted.
Figure 14B:
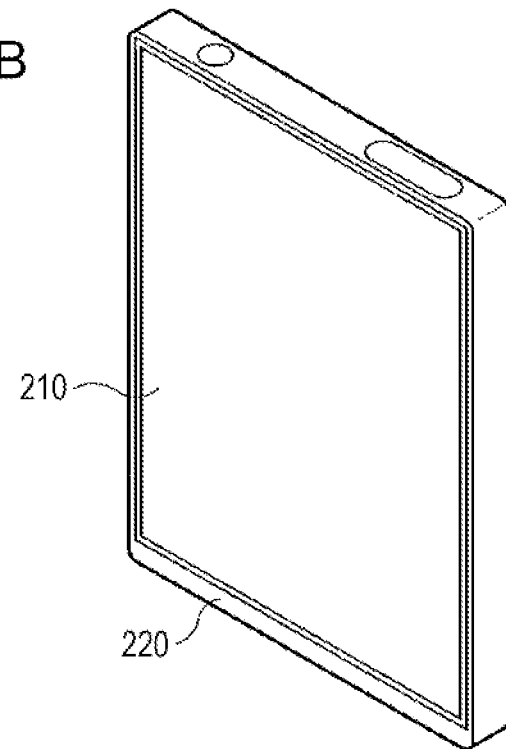
FIG. 14B is a perspective view illustrating the outer appearance of another electronic book (Application Example 1) on which a display device according to an embodiment of the present disclosure is mounted.

FIG. 14A illustrates the outer appearance of an electronic book to which the display device 101 according to the foregoing embodiment is applied. FIG. 14B illustrates the outer appearance of another electronic book to which the display device 101 according to the foregoing embodiment is applied. Both of the electronic books include, for example, a display unit 210 and a non-display unit 220. The display units 210 are configured by the display device 101 according to the foregoing embodiment.

Application Example 2

Figure 15:
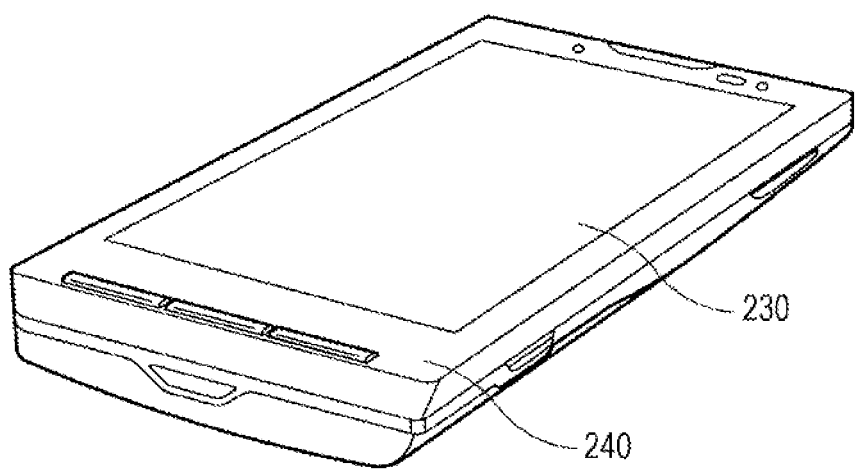
FIG. 15 is a perspective view illustrating the outer appearance of a smartphone (Application Example 2) on which a display device according to an embodiment of the present disclosure is mounted.

FIG. 15 illustrates the outer appearance of a smartphone to which the display device 101 according to the foregoing embodiment is applied. The smartphone includes, for example, a display unit 230 and a non-display unit 240. The display unit 230 is configured by the display device 101 according to the foregoing embodiment.

Application Example 3

Figure 16A:
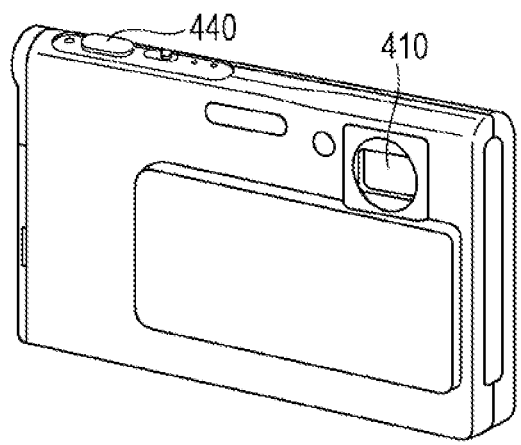
FIG. 16A is a perspective view illustrating the outer appearance of a digital camera (Application Example 3) on which a display device according to an embodiment of the present disclosure is mounted, when viewed from a front side.
Figure 16B:
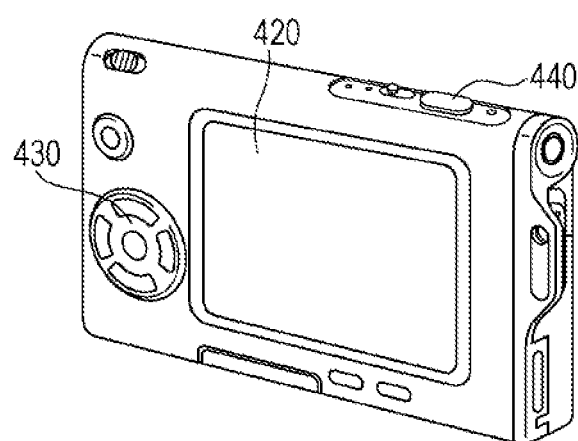
FIG. 16B is a perspective view illustrating the outer appearance of the digital camera (Application Example 3) on which the display device according to an embodiment of the present disclosure is mounted, when viewed from a rear side.

FIGS. 16A and 16B illustrate the outer appearance of a digital camera to which the display device 101 according to the foregoing embodiment is applied. FIG. 16A illustrates the outer appearance when the digital camera is viewed from the front side (object side) and FIG. 16B illustrates the outer appearance when the digital camera is viewed from the rear side (image side). The digital camera includes, for example, a light-emitting unit 410 for flash, a display unit 420, a menu switch 430, and a shutter button 440. The display unit 420 is configured by the display device 101 according to the foregoing embodiment.

Application Example 4

Figure 17:
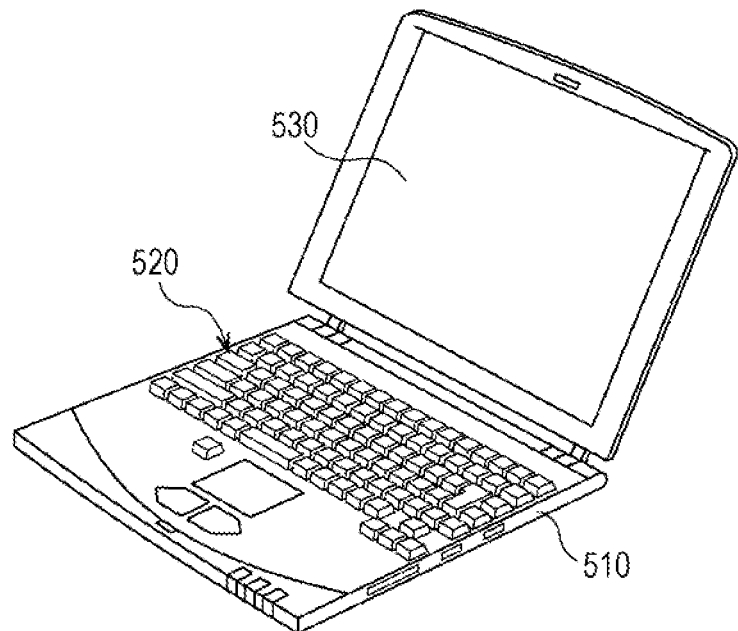
FIG. 17 is a perspective view illustrating the outer appearance of a note-type personal computer (Application Example 4) on which a display device according to an embodiment of the present disclosure is mounted.

FIG. 17 illustrates the outer appearance of a note-type personal computer to which the display device 101 according to the foregoing embodiment is applied. The note-type personal computer includes, for example, a body 510, a keyboard 520 used to perform an operation of inputting text or the like, and a display unit 530 displaying an image. The display unit 530 is configured by the display device 101 according to the foregoing embodiment.

Application Example 5

Figure 18:
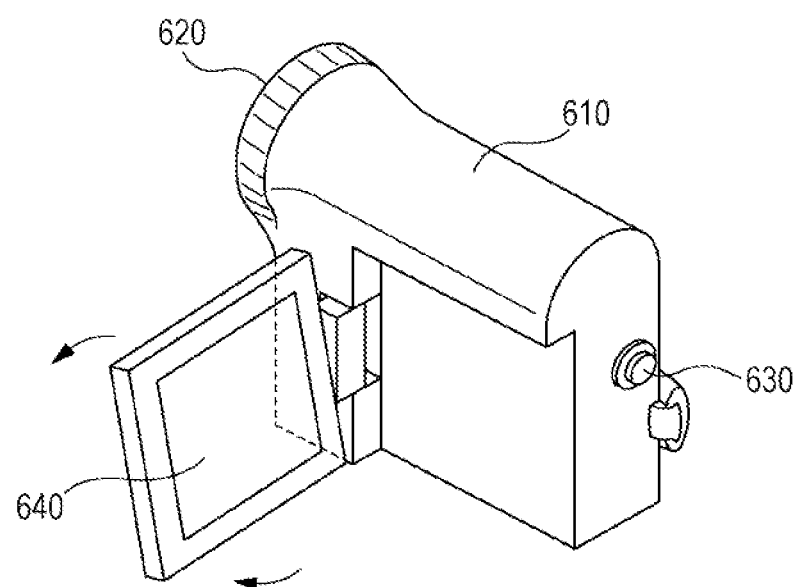
FIG. 18 is a perspective view illustrating the outer appearance of a video camera (Application Example 5) on which a display device according to an embodiment of the present disclosure is mounted.

FIG. 18 illustrates the outer appearance of a video camera to which the display device 101 according to the foregoing embodiment is applied. The video camera includes, for example, a body unit 610, a subject photographing lens 620 installed on the front side of the body unit 610, a start/stop switch 630 at the time of photography, and a display unit 640. The display unit 640 is configured by the display device 101 according to the foregoing embodiment.

Application Example 6

FIGS. 19A and 19B illustrate the outer appearance of a mobile phone to which the display device 101 according to the foregoing embodiment is applied. In the mobile phone, for example, an upper casing 710 and a lower casing 720 are connected by a connection unit (hinge unit) 730. The mobile phone includes a display 740, a sub-display 750, a picture light 760, and a camera 770. Of the constituent elements, the display 740 or the sub-display 750 is configured by the display device 101 according to the foregoing embodiment.

Application Examples of Illumination Device

Figure 20:
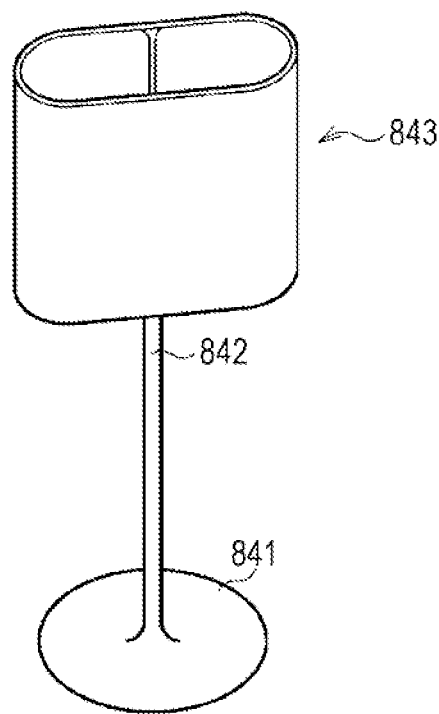
FIG. 20 is a perspective view illustrating the outer appearance of a first illumination device (Application Example 7) including a light-emitting device according to an embodiment of the present disclosure.
Figure 21:
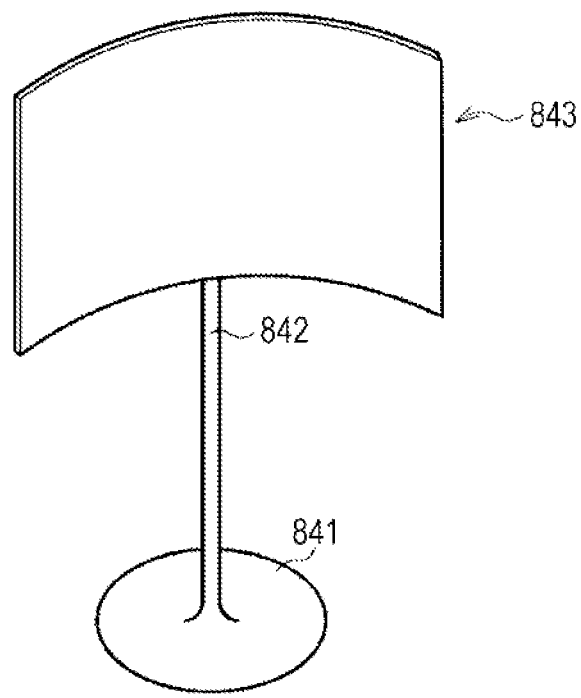
FIG. 21 is a perspective view illustrating the outer appearance of a second illumination device (Application Example 8) including a light-emitting device according to an embodiment of the present disclosure.

FIGS. 20 and 21 illustrate the outer appearances of table illumination devices to which the light-emitting device 1 or 2 according to the foregoing embodiment is applied. In the illumination devices, for example, an illumination unit 843 is mounted on a post 842 installed in a base 841. The illumination unit 843 is configured by any of the light-emitting devices 1 and 2 according to the foregoing first and second embodiments. The illumination unit 843 can be formed in any shape such as a cylindrical shape illustrated in FIG. 20 or a curved surface shape illustrated in FIG. 21 by curving a light guide plate 20 in a curved shape.

Figure 22:
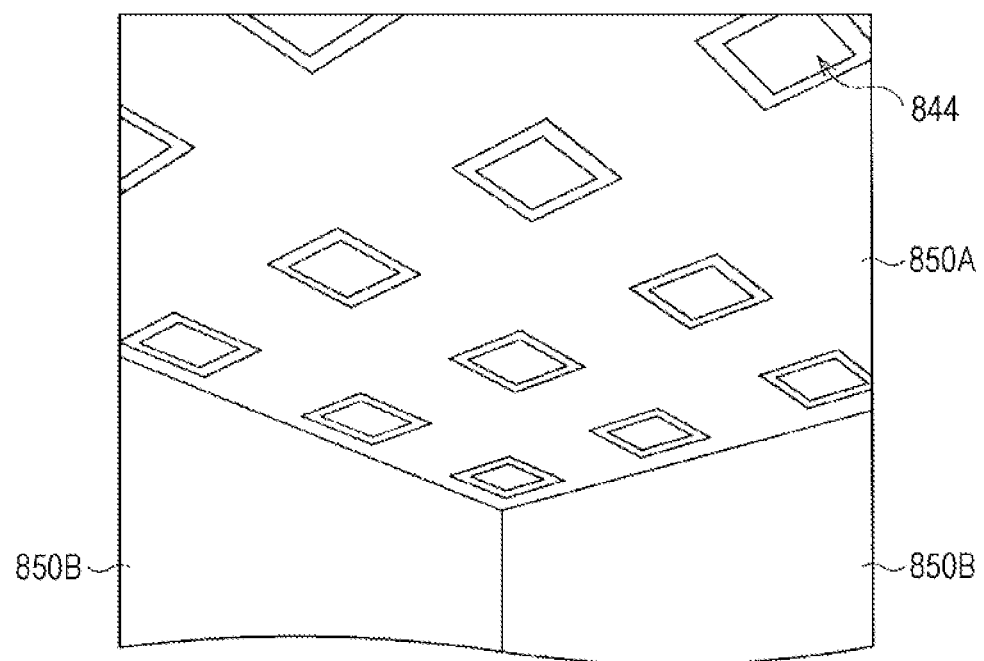
FIG. 22 is a perspective view illustrating the outer appearance of a third illumination device (Application Example 9) including a light-emitting device according to an embodiment of the present disclosure.

FIG. 22 illustrates the outer appearance of an indoor illumination device to which the light-emitting device 1 or 2 according to the foregoing embodiment is applied. The illumination device includes, for example, an illumination unit 844 configured by any of the light-emitting devices 1 and 2 according to the foregoing first and second embodiments. An appropriate number of illumination units 844 are disposed at appropriate intervals on a ceiling 850A of a building. The illumination unit 844 can be installed in any place such as a wall 850B or a floor (not illustrated) according to uses, as well as the ceiling 850A.

In the illumination devices, illumination is realized by light from the light-emitting device 1. Here, since the light-emitting device 1 or 2 in which the color regularity in the plane is improved, as described in the first embodiment, is included, illumination quality is improved.

Experiment Examples

Experiment Example 1-1

A sample of the light-emitting device 1 according to the foregoing first embodiment was manufactured. Here, 160 light sources 10 (16 light sources at pitches of 41 mm in the X direction and 10 light sources at pitches of 36 mm in the Y direction) were disposed on the reflection substrate 40 with a size of 32 inches. Here, the light reflection member 60 was not disposed. The distance L1 between the light source 10 and the wavelength conversion unit 20 was set to 6 mm, the distance L4 between the front surface 40S and the rear surface 30S is 30 mm, and the angle θ1 was set to 67.5° (an angle at which the intensity of the light from the light sources 10 is 38.2%), and the radius R1 was set to 14.5 mm.

Experiment Example 1-2

A sample of the light-emitting device 1 having the same configuration as that of Experiment Example 1-1 except that the angle θ1 was set to 52.4° (an angle at which the intensity of the light from the light sources 10 is 61.0%), and the radius R1 was set to 7.8 mm was manufactured.

Experiment Example 1-3

A sample of the light-emitting device 1 having the same configuration as that of Experiment Example 1-1 except that the angle θ1 was set to 56.9° (an angle at which the intensity of the light from the light sources 10 is 54.6%), and the radius R1 was set to 9.2 mm was manufactured.

Experiment Example 1-4

A sample of the light-emitting device having the same configuration as that of Experiment Example 1-1 except that a sheet-shaped wavelength conversion unit was disposed across the entire screen instead of the wavelength conversion units 20 was manufactured.

In the samples of Experiment Examples 1-1 to 1-4, tristimulus values X, Y, and Z of XYZ display systems observed in the region immediately above any one of the lightened light sources 10 were measured. The results are shown in FIGS. 23A to 23D. In FIGS. 23A to 23D, the horizontal axis represents a position on which the central position (the position of the optical axis) of the light source 10 on the XY plane is centered and the vertical axis represents the normalized intensity of the tristimulus values X, Y, and Z.

Figure 23A:
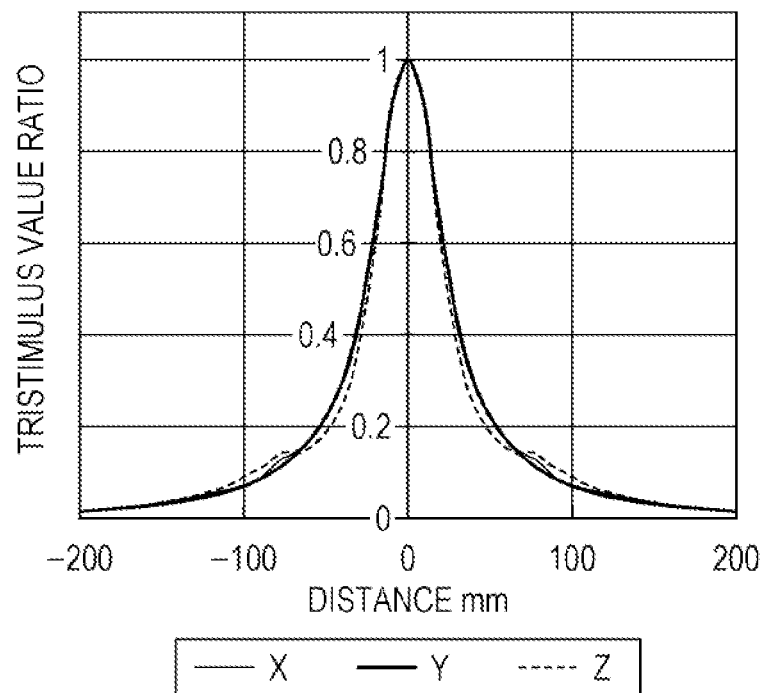
FIG. 23A is a characteristic diagram illustrating distributions of tristimulus values X, Y, and Z in Experiment Example 1-1.
Figure 23B:
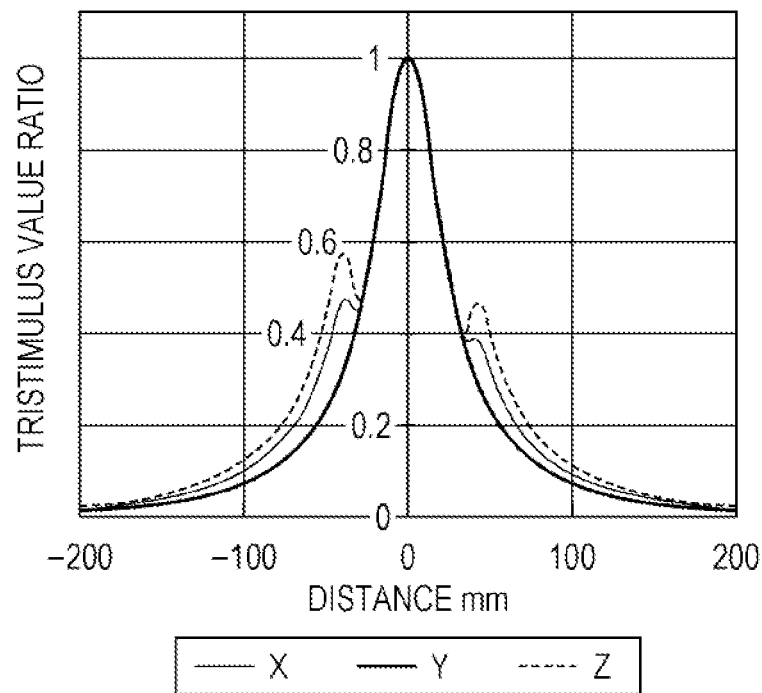
FIG. 23B is a characteristic diagram illustrating distributions of tristimulus values X, Y, and Z in Experiment Example 1-2.
Figure 23C:
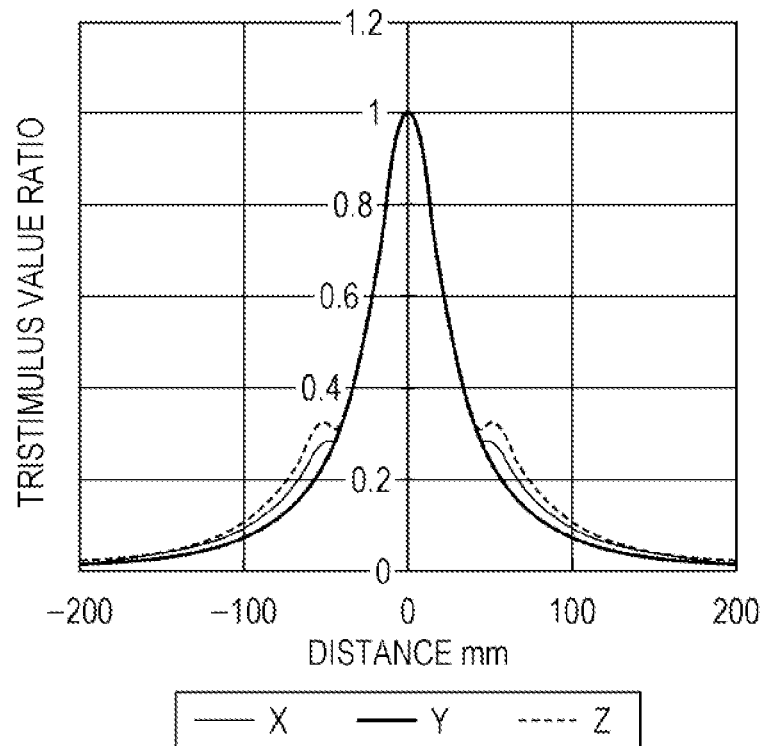
FIG. 23C is a characteristic diagram illustrating distributions of tristimulus values X, Y, and Z in Experiment Example 1-3.
Figure 23D:
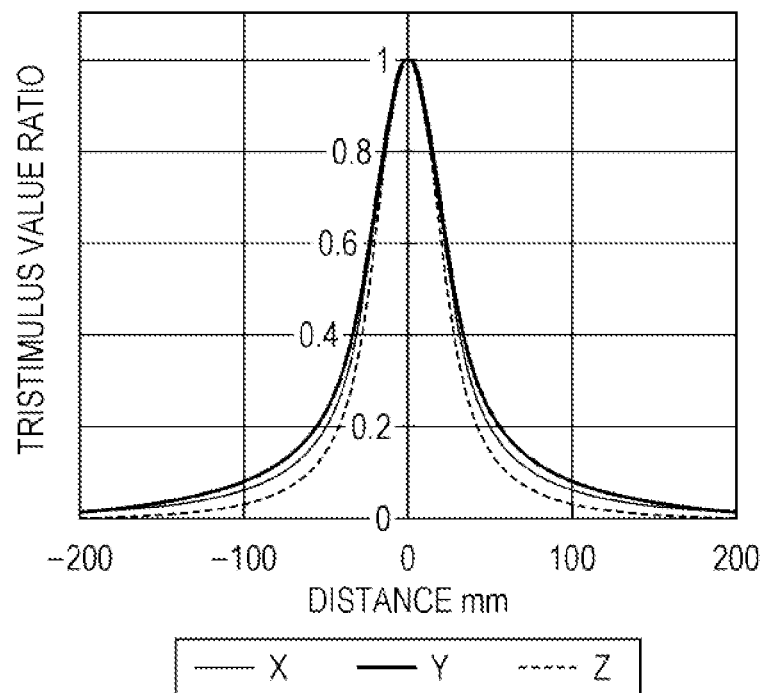
FIG. 23D is a characteristic diagram illustrating distributions of tristimulus values X, Y, and Z in Experiment Example 1-4.

In Experiment Examples 1-4, a variation in the distributions of the color components of the tristimulus values X, Y, and Z occurred away from the central position of the light source 10, and a tendency to exhibit yellow gradually was shown (see FIG. 23D). On the other hand, in Experiment Example 1-1, the distribution of the color components gathered, and the variation in the distributions considerably decreased (see FIG. 23A). In Experiments 1-2, small peaks on both sides neighboring a main peak were observed in the distributions of the X and Y components (see FIG. 23B). The small peaks are considered to occur since the contours of the direct upper portions 21 were projected to the optical sheet 30. Further, in Experiment Examples 1-3, it was confirmed that the intensity of the small peaks observed on both sides neighboring to the main peak was suppressed to be small compared to Experiment Example 2 (see FIG. 23C). Accordingly, it was confirmed that it was preferable to dispose the direct upper portion 21 at the position at which the condition expression (1) is satisfied.

Figure 24B:
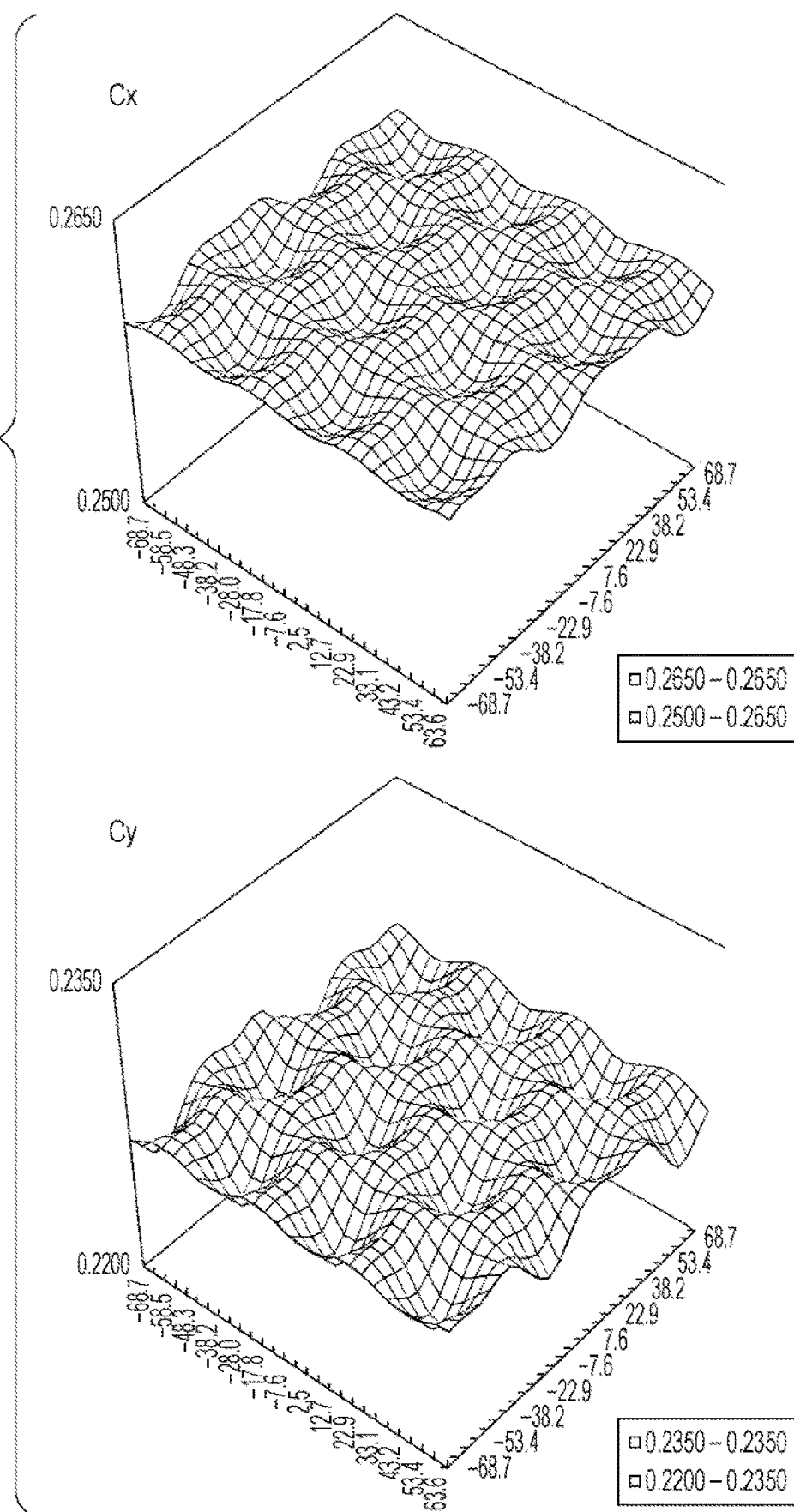
FIG. 24B is a characteristic diagram illustrating a Cx distribution and a Cy distribution in a central region of the light emission surface in Experiment Example 1-4.
Figure 25A:
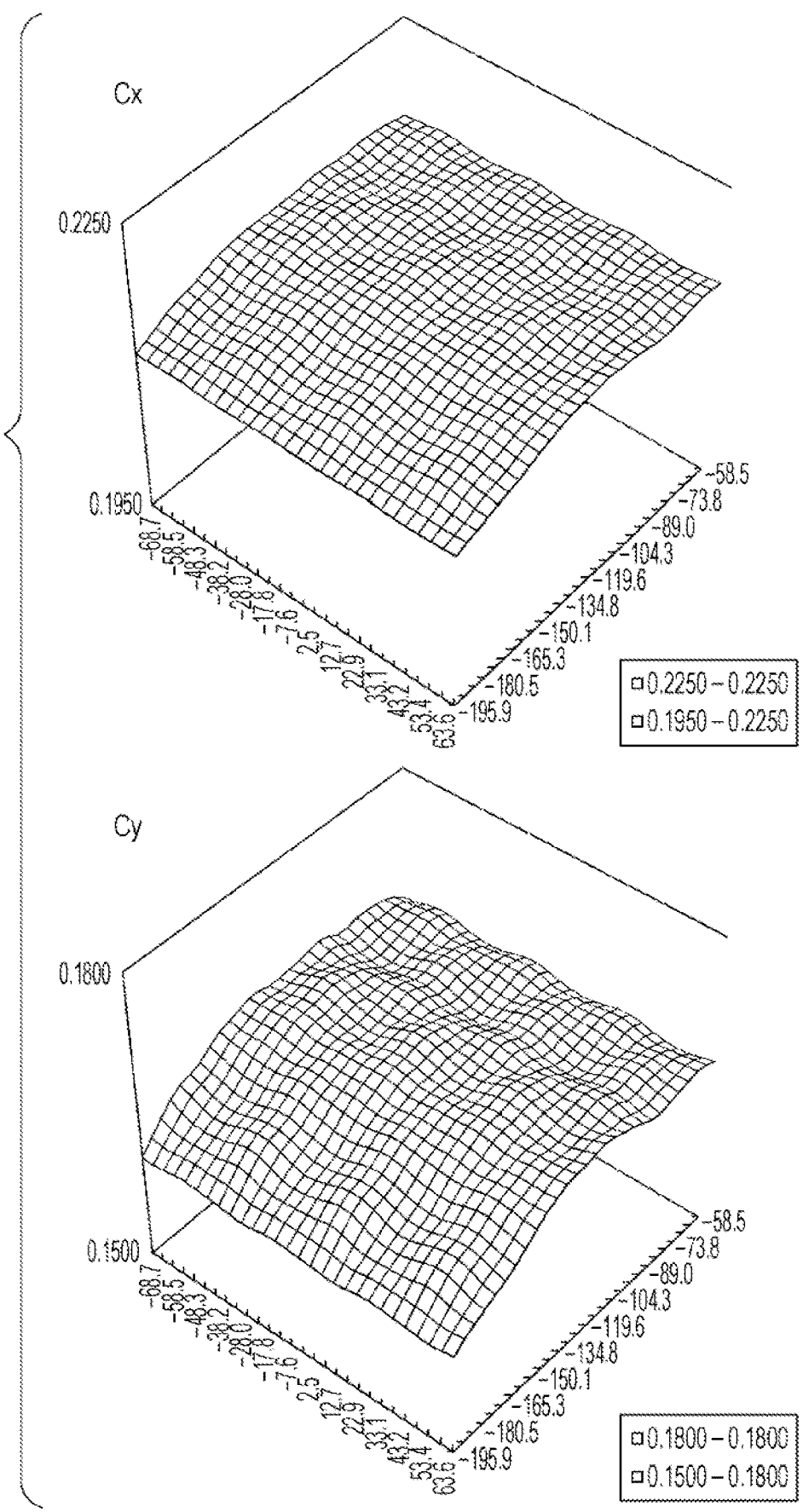
FIG. 25A is a characteristic diagram illustrating a Cx distribution and a Cy distribution in an end region of the light emission surface in Experiment Example 1-1.
Figure 25B:
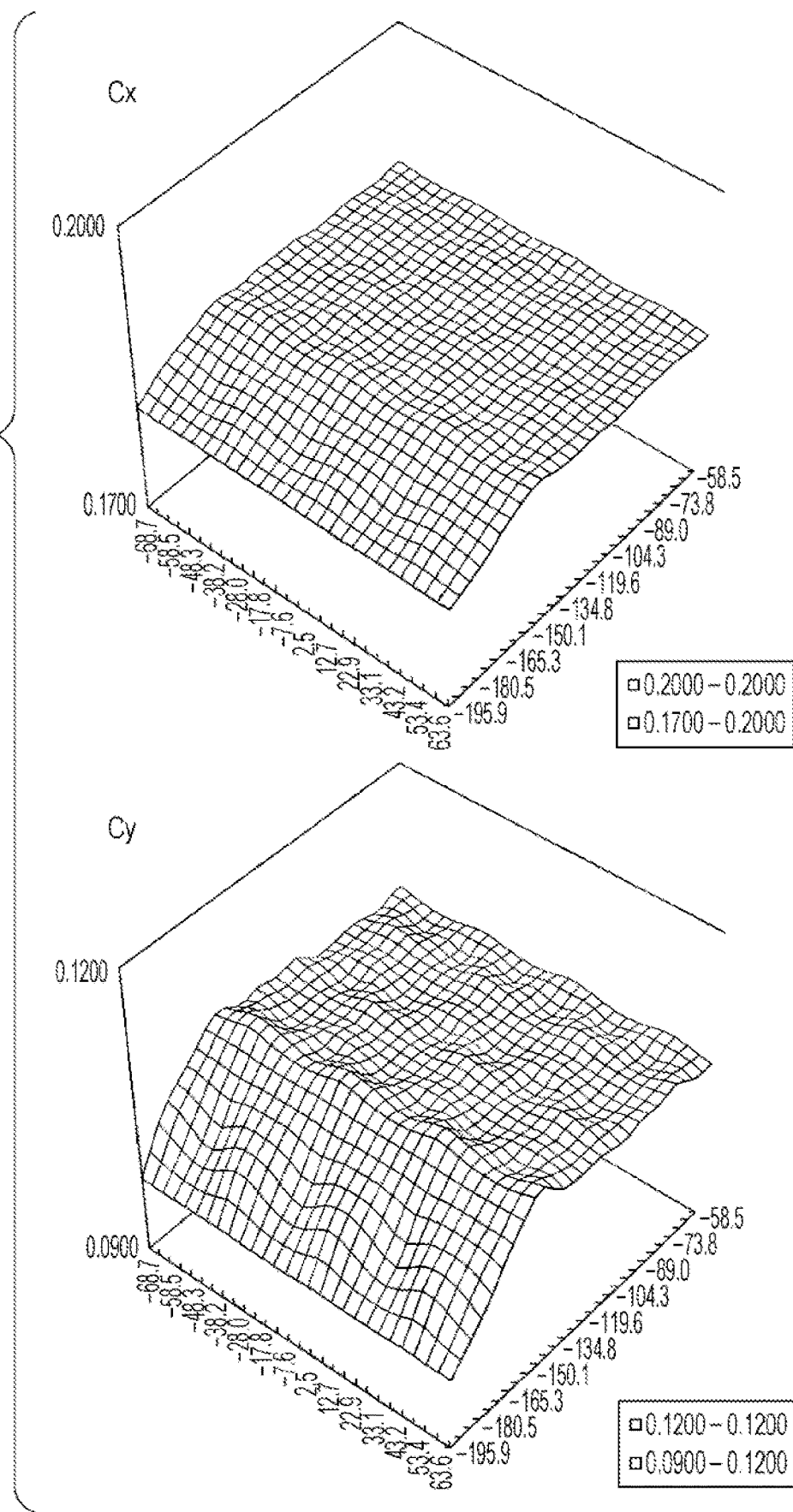
FIG. 25B is a characteristic diagram illustrating a Cx distribution and a Cy distribution in an end region of the light emission surface in Experiment Example 1-2.
Figure 25C:
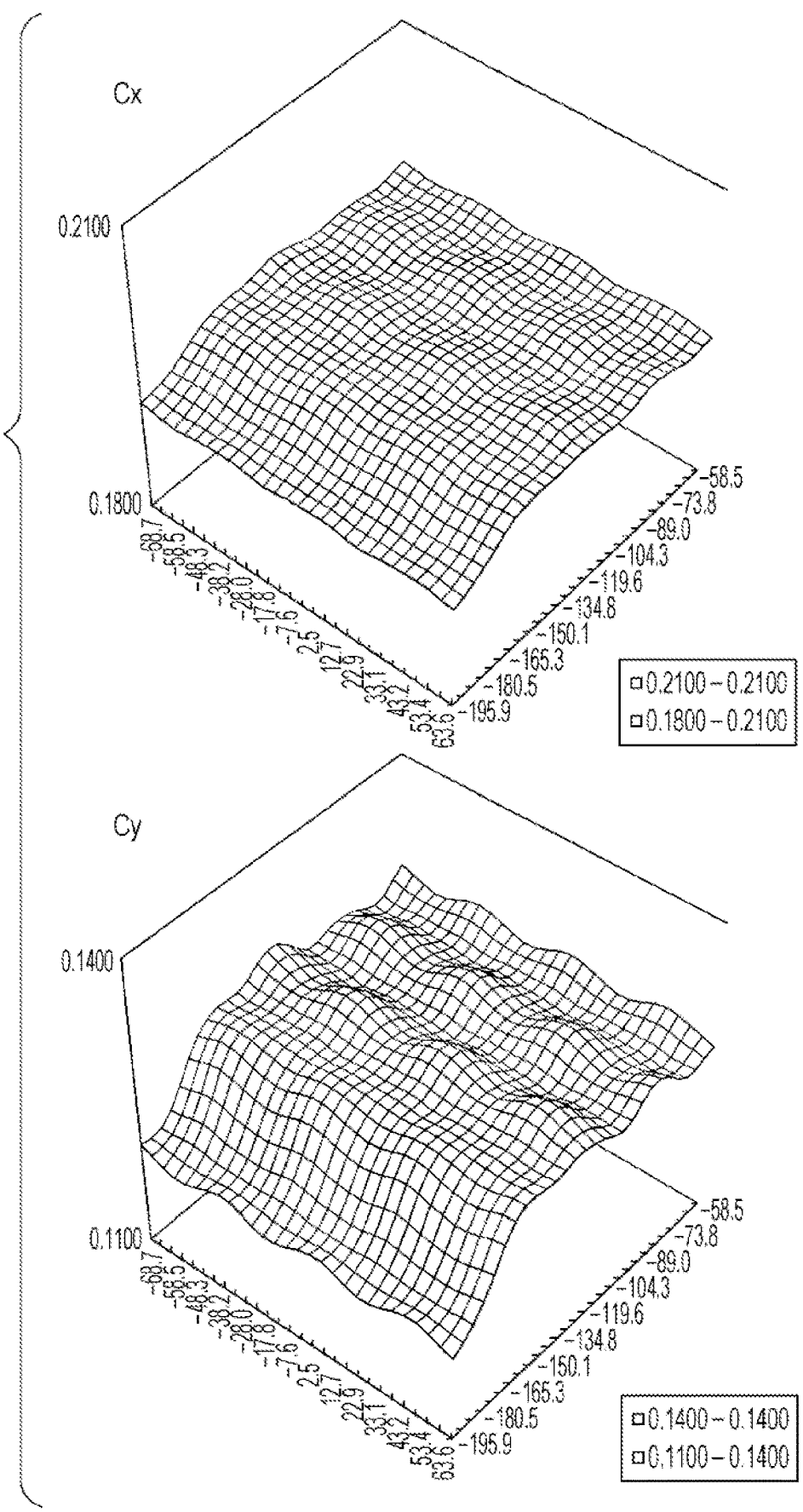
FIG. 25C is a characteristic diagram illustrating a Cx distribution and a Cy distribution in an end region of the light emission surface in Experiment Example 1-3.
Figure 25D:
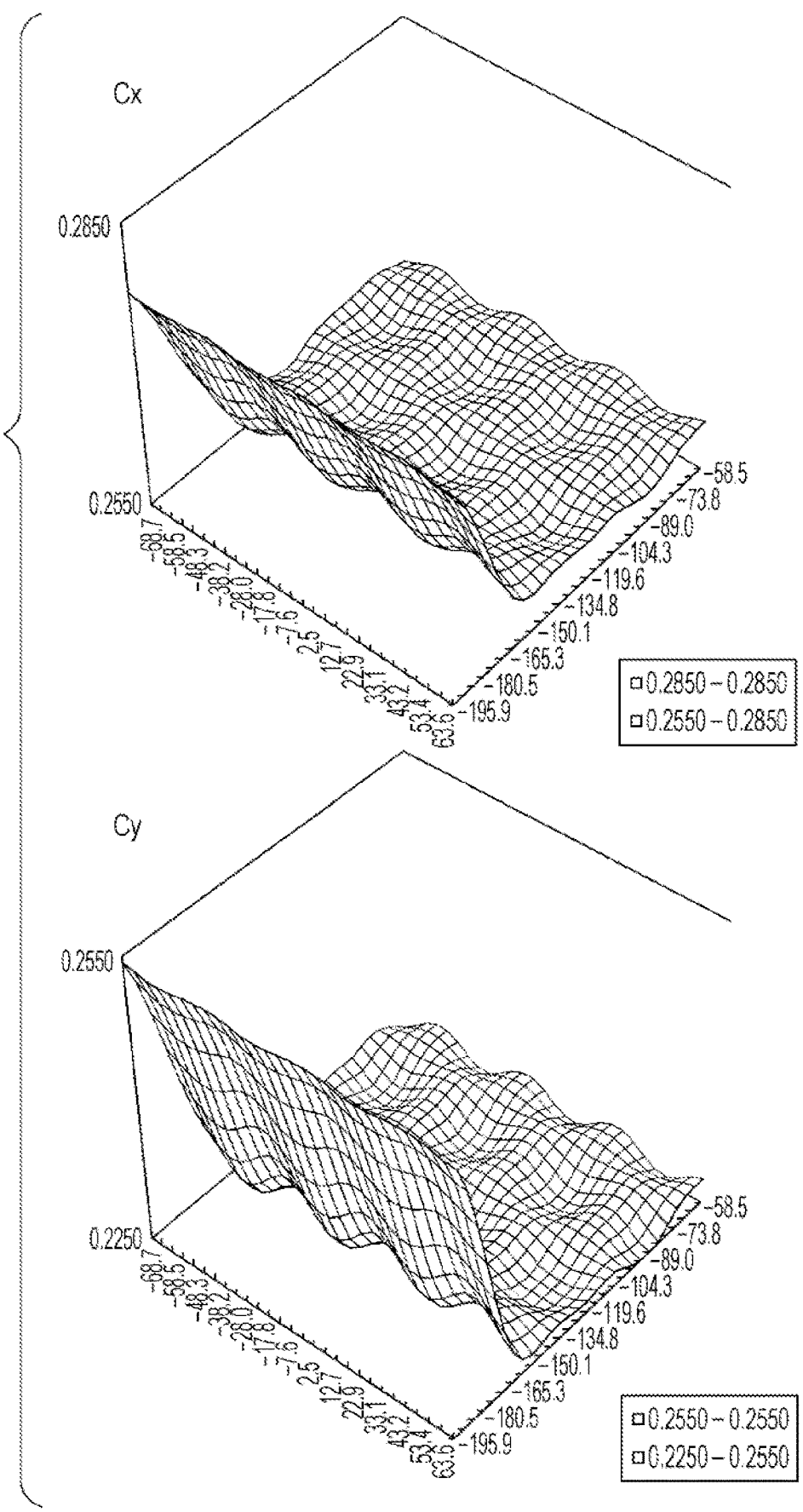
FIG. 25D is a characteristic diagram illustrating a Cx distribution and a Cy distribution in an end region of the light emission surface in Experiment Example 1-4.

Next, Cx and Cy distributions in the central region of the light emission surface when all of the light sources 10 are turned on were measured for the samples of Experiment Examples 1-1 and 1-4 described above. The results are illustrated in FIGS. 24A and 24B. In FIGS. 24A and 24B, the left side shows the Cx distribution and the right side shows the Cy distribution. Here, the measurement was performed for a surrounding region of 137.4 mm in the vicinity of the center of the light emission surface.

In Experiment Example 1-1, it was observed that both of the Cx distribution and the Cy distribution were flatter than those of Experiment Example 1-4.

Likewise, the Cx and Cy distributions ware measured in an end region of the light emission surface for the samples of Experiment Examples 1-1 to 1-4 described above. The results are illustrated in FIGS. 25A to 25D. In FIGS. 25A to 25D, the left side shows the Cx distribution and the right side shows the Cy distribution. Here, the measurement was performed for a surrounding region of 137.4 mm in the vicinity of the end region of the light emission surface.

As illustrated in FIGS. 25A to 25D, it was observed that both of the Cx distribution and the Cy distribution were the flattest in Experiment Example 1-1. In Experiment Examples 1-2 and 1-3, a steep change was alleviated in both of the Cx distribution and the Cy distribution compared to Experiment Example 1-4, and thus the flatness was known to be improved.

Experiment Example 2-1

A sample of the light-emitting device 1 having the same configuration as that of Experiment Example 1-1 except that the light reflection member 60 was further disposed was manufactured. Here, 60 light sources 10 (10 light sources at pitches of 66 mm in the X direction and 6 light sources at pitches of 60 mm in the Y direction) were disposed on the reflection substrate 40 with a size of 32 inches. Further, the distance L5 (see FIG. 2B) between the light source 10 and the light reflection member 60 was set to 6.5 mm, $\tan^{-1}(R2/L2)$ was set to 21.4°<27°, and the radius R2 was set to 9.2 mm.

Experiment Example 2-2

A sample of the light-emitting device 1 having the same configuration as that of Experiment Example 2-1 except that $\tan^{-1}(R2/L2)$ was set to 27.1°<27°, and the radius R2 was set to 12.0 mm was manufactured.

Experiment Example 2-3

A sample of the light-emitting device 1 having the same configuration as that of Experiment Example 2-1 except that $\tan^{-1}(R2/L2)$ was set to 21.4°<27°, and the radius R1 was set to 9.2 mm was manufactured.

Experiment Example 2-4

A sample of the light-emitting device 1 having the same configuration as that of Experiment Example 2-1 except that $\tan^{-1}(R2/L2)$ was set to 24.3°<27°, and the radius R2 was set to 10.6 mm was manufactured.

Experiment Example 2-5

A sample of the light-emitting device having the same configuration as that of Experiment Example 2-1 except that a sheet-shaped wavelength conversion unit was disposed across the entire screen, instead of the wavelength conversion units 20 was manufactured.

Figure 26:
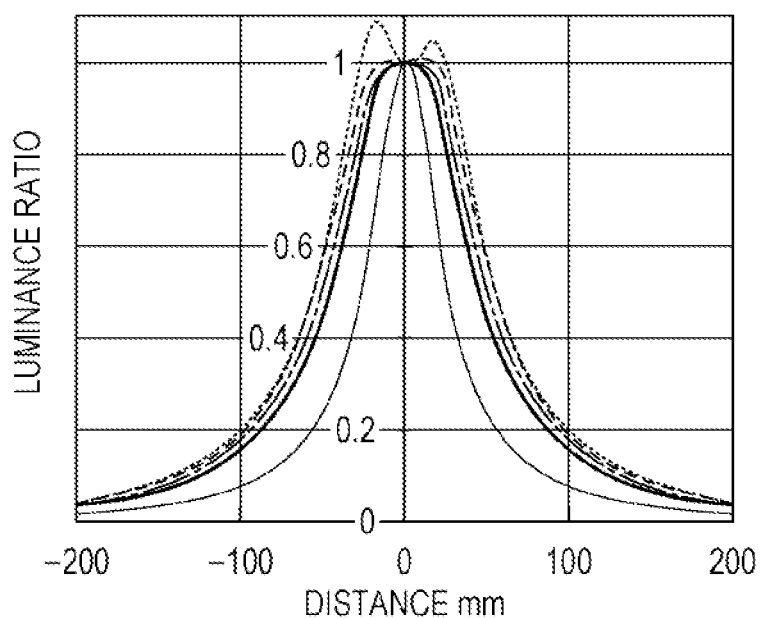
FIG. 26 is a characteristic diagram illustrating luminance distributions of a Y component in Experiment Examples 2-1 to 2-5.
Figure 27A:
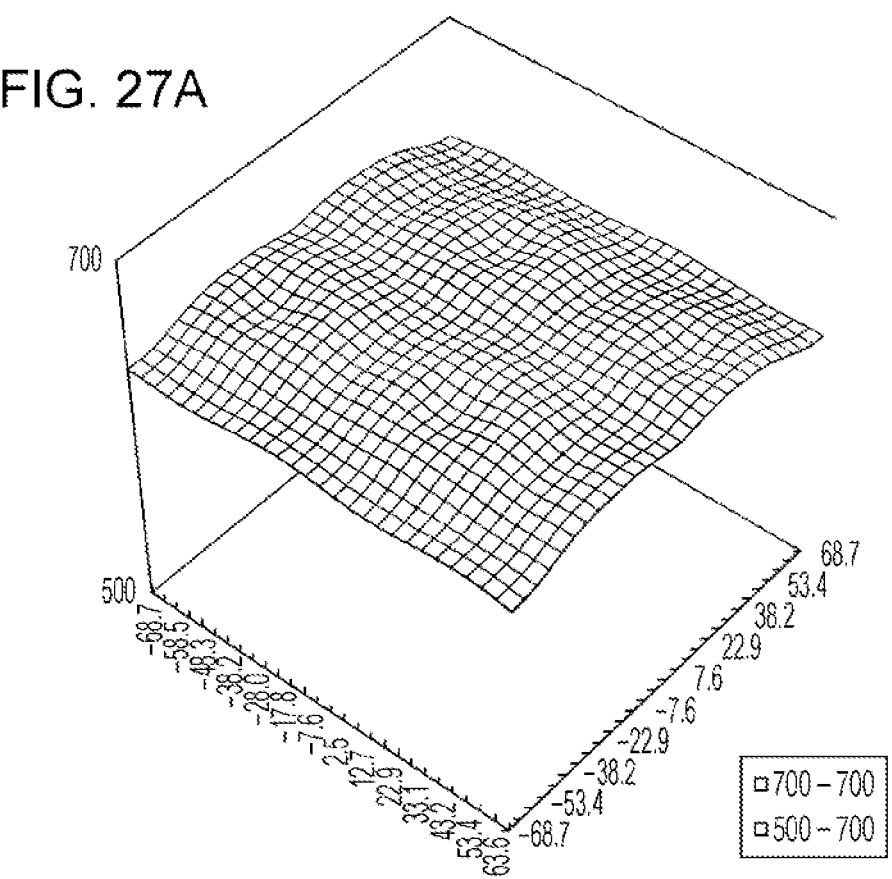
FIG. 27A is a characteristic diagram illustrating a luminance distribution in the central region of the light emission surface in Experiment Example 2-1.
Figure 27B:
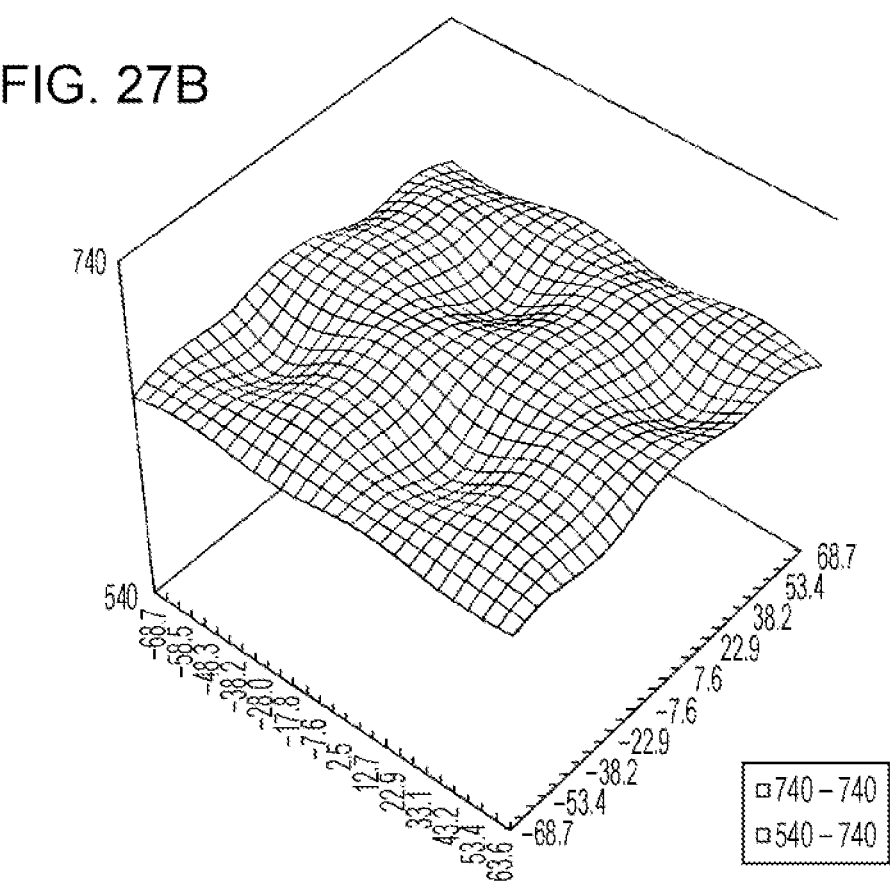
FIG. 27B is a characteristic diagram illustrating a luminance distribution in the central region of the light emission surface in Experiment Example 2-2.
Figure 27C:
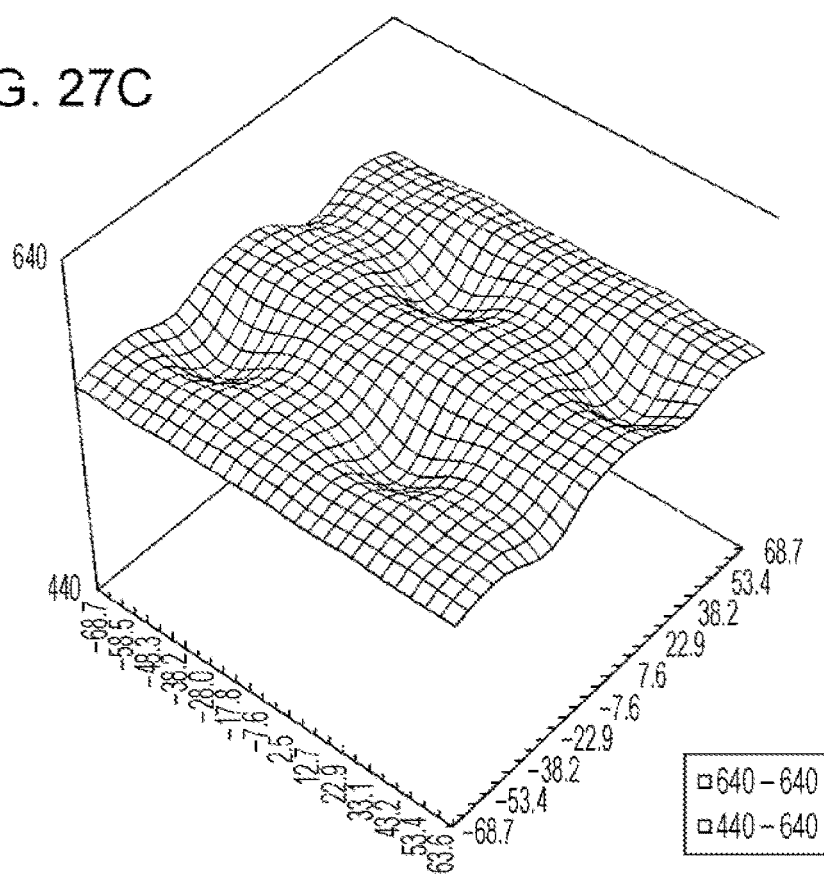
FIG. 27C is a characteristic diagram illustrating a luminance distribution in the central region of the light emission surface in Experiment Example 2-3.
Figure 27D:
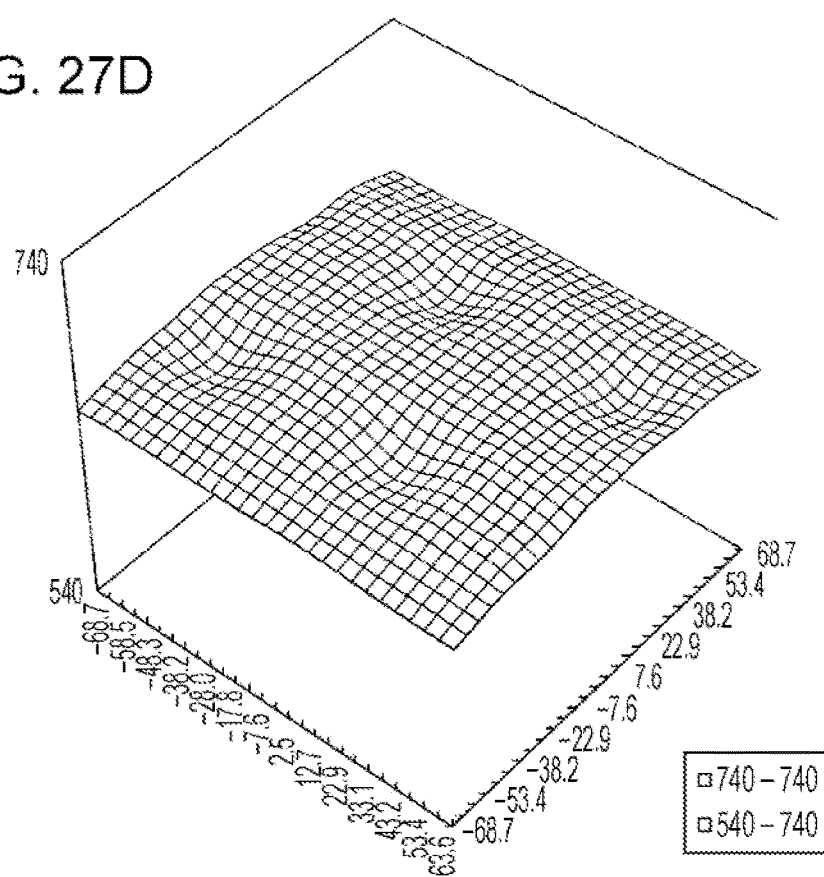
FIG. 27D is a characteristic diagram illustrating a luminance distribution in the central region of the light emission surface in Experiment Example 2-4.
Figure 27E:
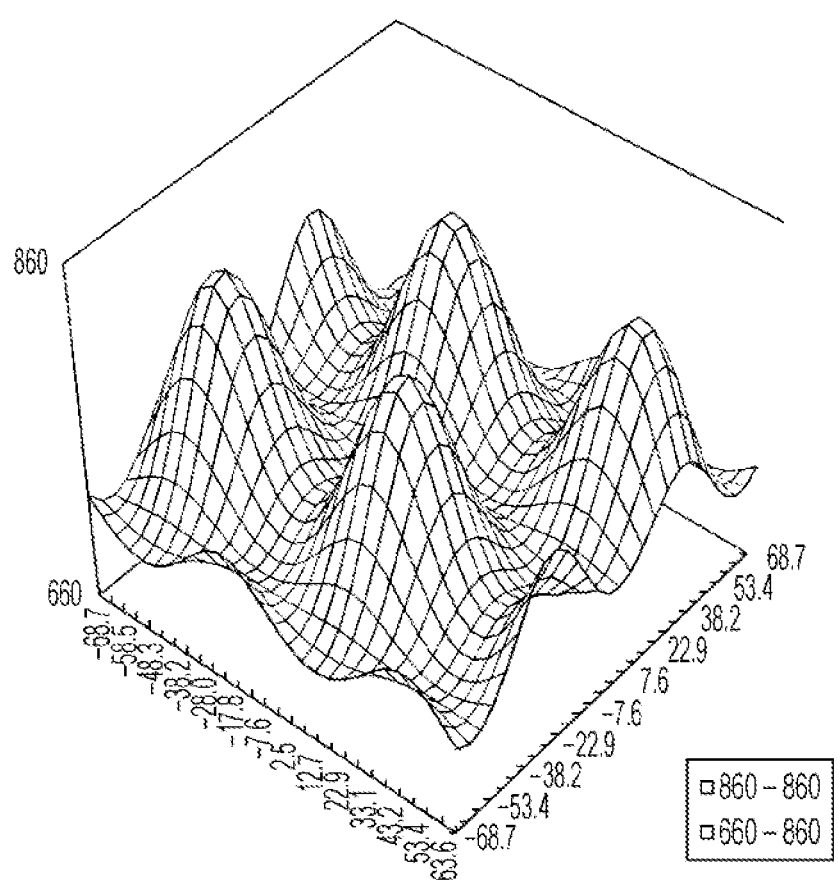
FIG. 27E is a characteristic diagram illustrating a luminance distribution in the central region of the light emission surface in Experiment Example 2-5.

In the samples of Experiment Examples 2-1 to 2-5, the distribution of the luminance Y components of XYZ display systems observed in the region immediate above any one of the lightened light sources 10 were measured. The results are shown in FIG. 26. In FIG. 26, the horizontal axis represents a position on which the central position (the position of the optical axis) of the light source 10 on the XY plane is centered and the vertical axis represents the normalized luminance of the Y component.

In Experiment Examples 2-1 and 2-4, it was confirmed that steepness in the vicinity of the central position of the light source 10 was alleviated in comparison to Experiment Example 1-4. In Experiment Examples 2-2 and 2-3, steepness in the vicinity of the central position of the light source 10 was alleviated, but deterioration in the flatness was shown. From this result, it was confirmed that it is preferable to dispose the light reflection member 60 at the position at which the condition expression (2) is satisfied.

Next, a luminance distribution in the central region of the light emission surface when all of the light sources 10 are turned on was measured for the samples of Experiment Examples 2-1 to 2-5 described above. The results are illustrated in FIGS. 27A to 27E. Here, the measurement was performed for a surrounding region of 137.4 mm in the vicinity of the center of the light emission surface.

In Experiment Examples 2-1 and 2-4, it was observed that the luminance distribution was flatter than that of Experiment Example 2-5. In Experiment Examples 2-2 and 2-3, the fatter luminance distribution was known to be obtained than Experiment Example 2-5.

Experiment Example 3-1

Figure 28A:
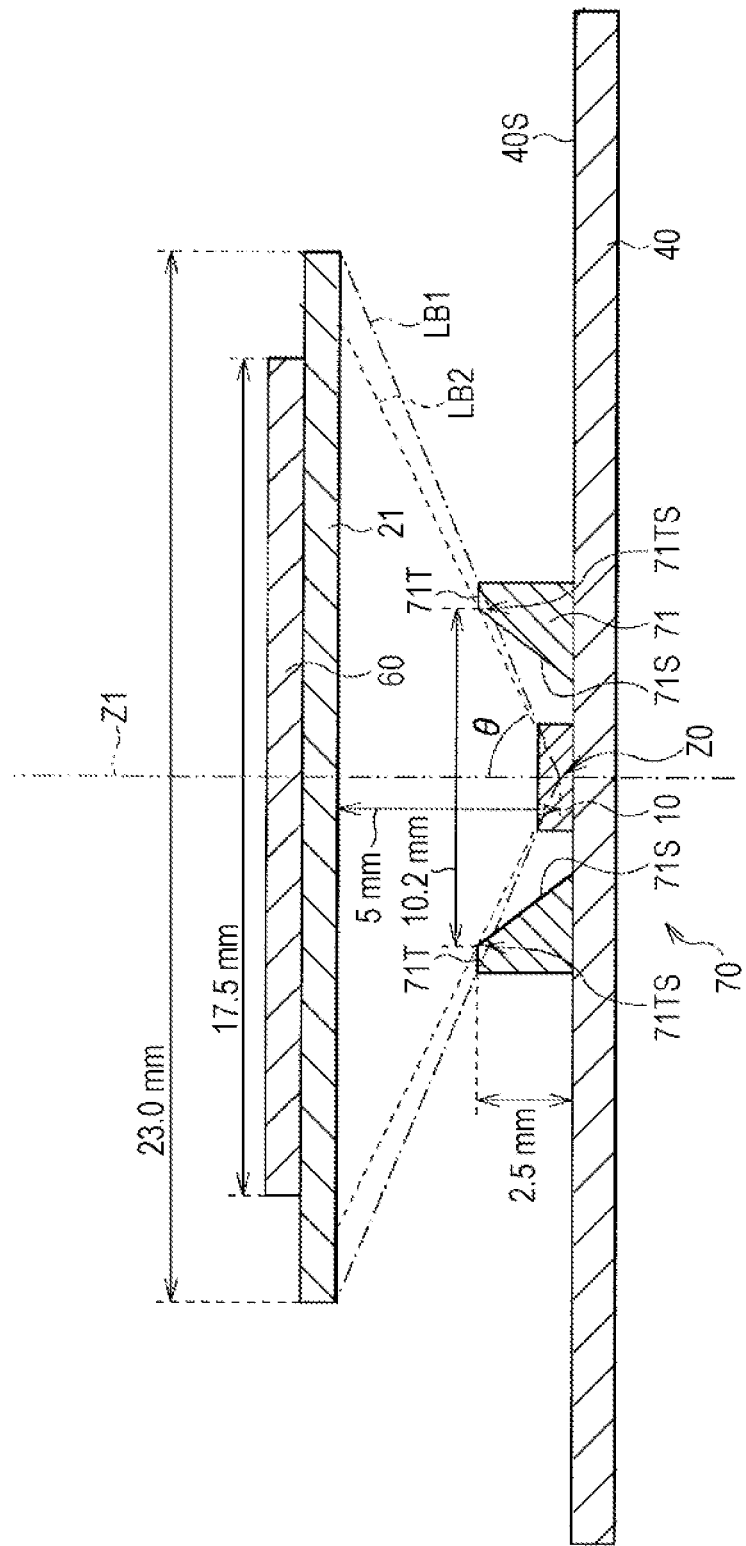
FIG. 28A is a schematic diagram illustrating the configuration of main units of a light-emitting device in Experiment Example 3-1.

A sample (see FIG. 28A) of the light-emitting device 3 according to the foregoing third embodiment was manufactured. Here, the planar shapes of the direct upper portion 21 of the wavelength conversion unit 20 and the light reflection member 60 were set to, for example, octagonal shapes illustrated in FIG. 2A. As illustrated in FIGS. 28A, the width of the direct upper portion 21 was set to 23.0 mm and the width of the light reflection member 60 was set to 17.5 mm. In the light-shielding member 70, an interval between upper ends 71TS at which the inner surfaces 71S and the top surfaces 71T intersect was set to 10.2 mm. The height (a distance between the front surface 40S and the top surface 71T) of the wall portion 71 was set to 2.5 mm and the distance between the light emission point Z0 of the light source 10 and the direct upper portion 21 of the wavelength conversion unit 20 was set to 5 mm. The distance L4 (not illustrated in FIG. 28A) between the front surface 40S and the rear surface 30S was set to 30 mm. In a sample of Experiment Example 3-1, as illustrated in FIG. 28A, a part of the wall portion 71 was set to reach the straight line LB1. That is, all of the light from the light source 10 was set to be incident on the direct upper portion 21 or the wall portion 71.

Experiment Example 3-2

Figure 28B:
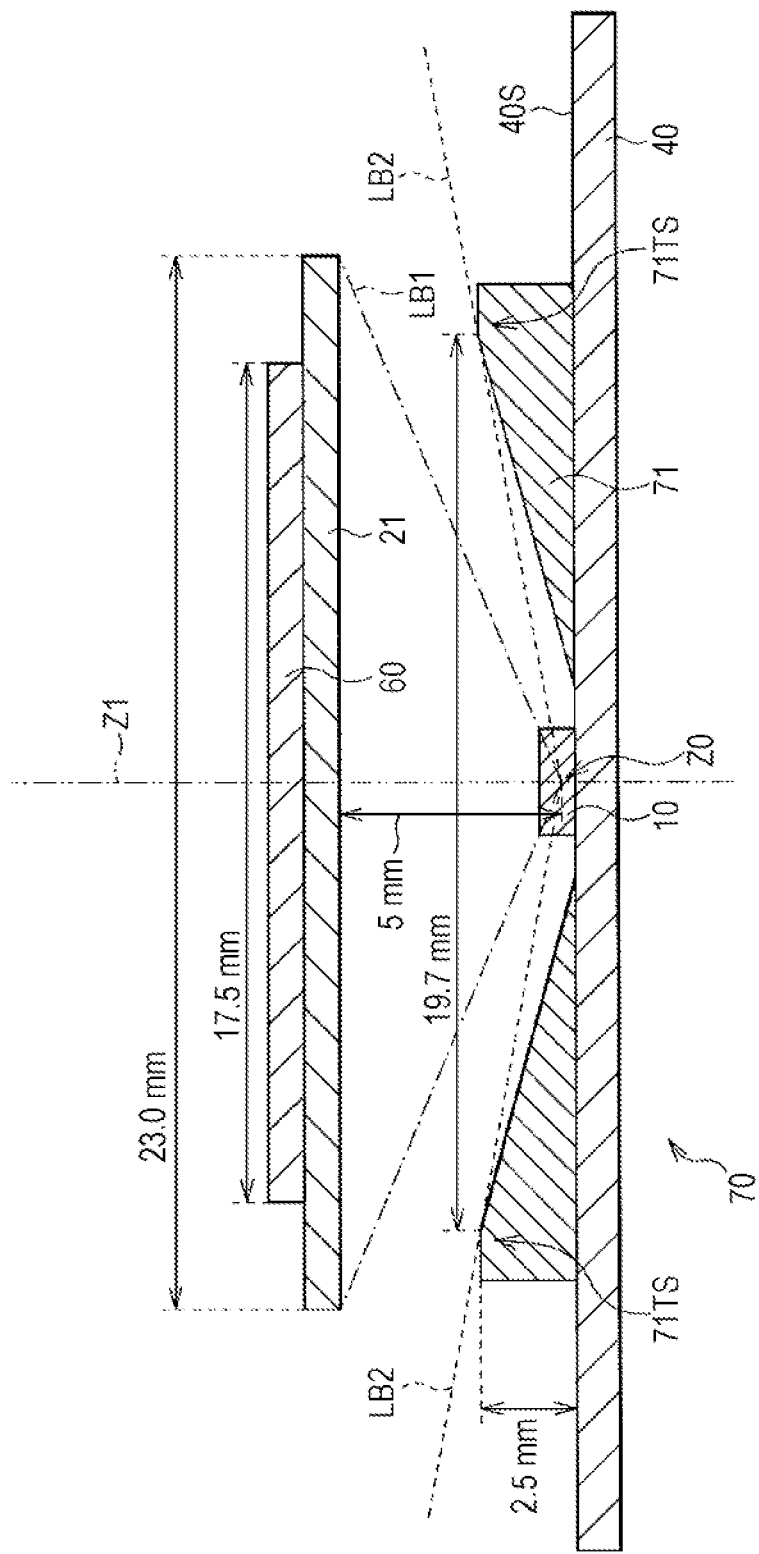
FIG. 28B is a schematic diagram illustrating the configuration of main units of a light-emitting device in Experiment Example 3-2.

A sample of the light-emitting device 3 having the same configuration as that of Experiment Example 3-1 except that the interval between the upper ends 71TS was set to 19.7 mm in the light-shielding member 70 and a part of the light from the light source 10 was oriented directly from a gap between the direct upper portion 21 and the wall portion 71 to the optical sheet 30 was manufactured (see FIG. 28B).

Experiment Example 3-3

A sample of the light-emitting device 3 having the same configuration as that of Experiment Example 3-1 except that the light-shielding member 70 was not installed was manufactured (see FIG. 28C).

Figure 29A:
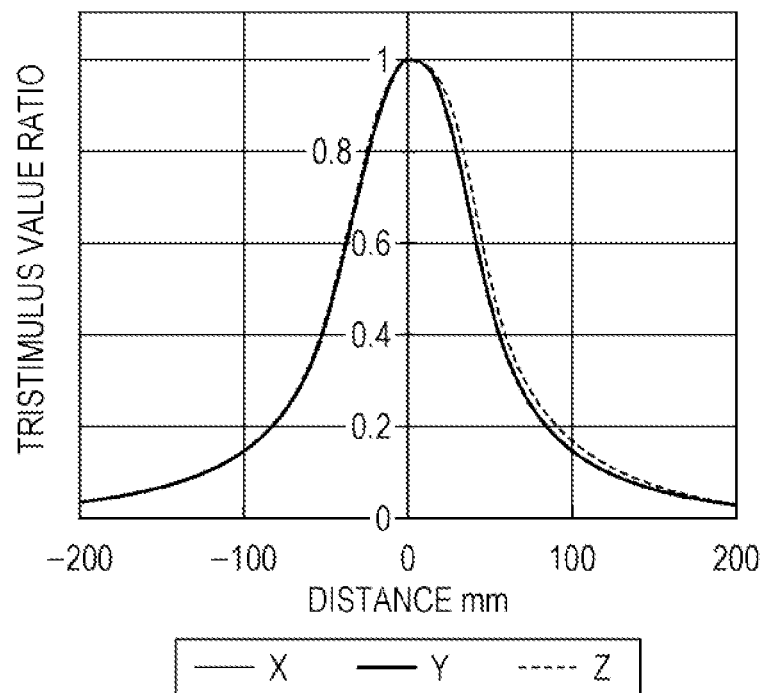
FIG. 29A is a characteristic diagram illustrating distributions of tristimulus values X, Y, and Z in Experiment Example 3-1.
Figure 29B:
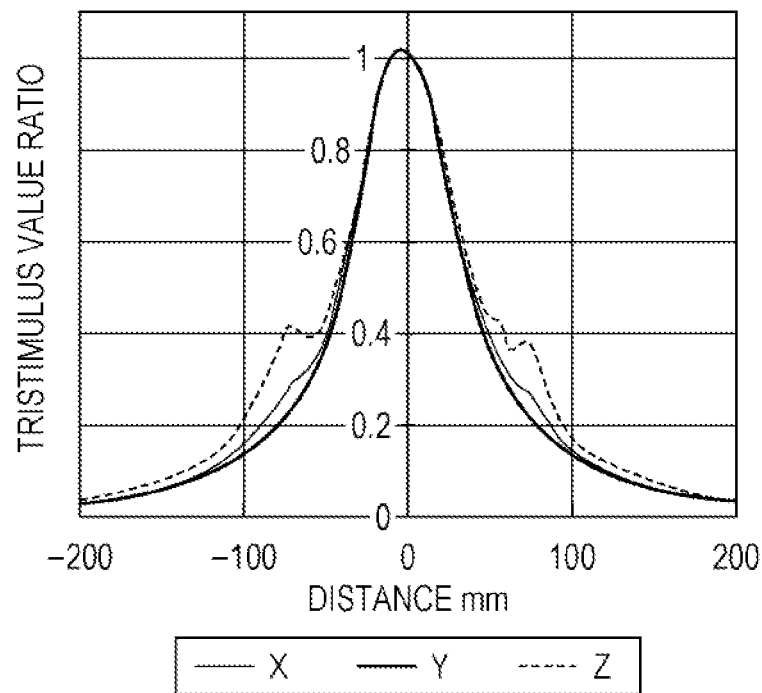
FIG. 29B is a characteristic diagram illustrating distributions of tristimulus values X, Y, and Z in Experiment Example 3-2.
Figure 29C:
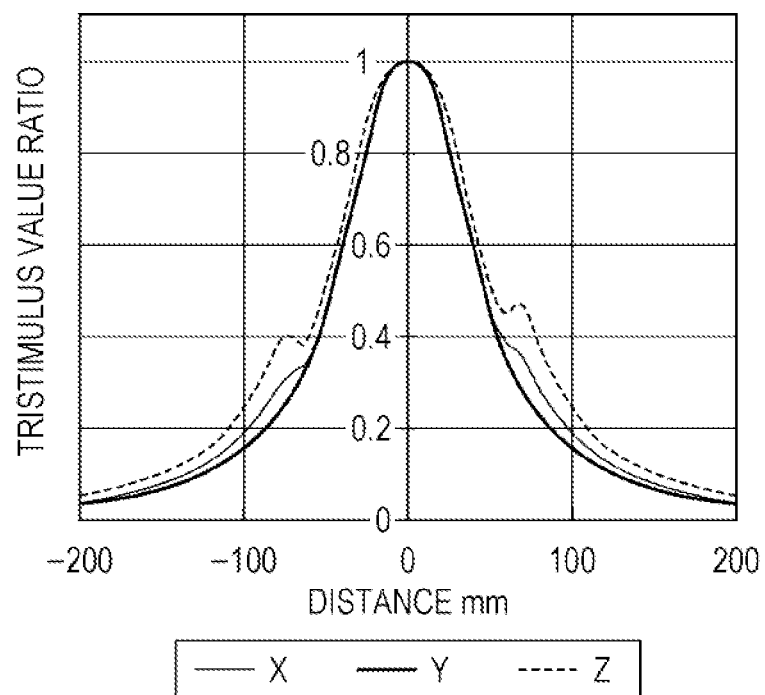
FIG. 29C is a characteristic diagram illustrating distributions of tristimulus values X, Y, and Z in Experiment Example 3-3.

In the samples of Experiment Examples 3-1 to 3-5, tristimulus values X, Y, and Z of XYZ display systems observed in the region immediate above any one of the lightened light sources 10 were measured. The results are shown in FIGS. 29A to 29C. In FIGS. 29A to 29C, the horizontal axis represents a position on which the central position (the position of the optical axis) of the light source 10 on the XY plane is centered and the vertical axis represents the normalized intensity of the tristimulus values X, Y, and Z.

As illustrated in 29A to 29C, in Experiment Examples 3-1 and 3-2 in which the light-shielding member 70 is installed, it was known a that variation (luminance irregularity) of the stimulus value Z (blue component light) was mainly improved, compared to Experiment Example 3-3 (see FIG. 29C) in which the light-shielding member 70 is not present. In particular, in Experiment Example 3-1 (see FIG. 29A), of the light from the light source 10, light oriented directly from the circumference of the direct upper portion 21 to the optical sheet 30 without being blocked by the wall portion 71 does not occur due to the structure. Therefore, compared to Experiment Example 3-2 (see FIG. 29B), in Experiment Example 3-1, the result was obtained in which the distributions of the color components of the tristimulus values X, Y, and Z were further improved and the distributions of the color components of the tristimulus values X, Y, and Z were almost identical to each other (see FIG. 29A). In this way, it was confirmed that, in particular, a variation in the stimulus value Z (blue component light) was sufficiently suppressed by disposing the light-shielding member 70 to surround the light source 10.

The disclosure has been described above exemplifying the embodiments, but embodiments of the present disclosure are not limited to the embodiments and various modifications can be made. For example, the materials, thickness, and the like of the layers described in the foregoing embodiments are not limited, but the layers have other materials and thicknesses.

For example, in the foregoing embodiments, the case in which the light source 10 is an LED has been described, but the light source 10 may be configured as a semiconductor laser or the like.

Figure 30A:
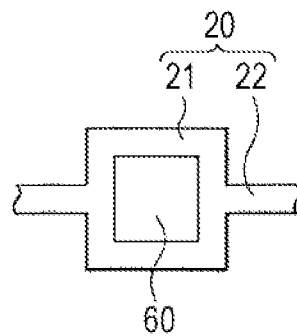
FIG. 30A is a schematic diagram illustrating the shape of a wavelength conversion unit and a light reflection member according to a first modification example.
Figure 30B:
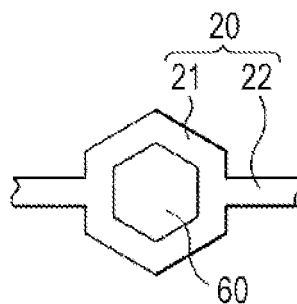
FIG. 30B is a schematic diagram illustrating the shape of a wavelength conversion unit and a light reflection member according to a second modification example.
Figure 30C:
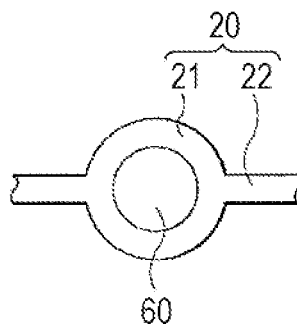
FIG. 30C is a schematic diagram illustrating the shape of a wavelength conversion unit and a light reflection member according to a third modification example.
Figure 32:
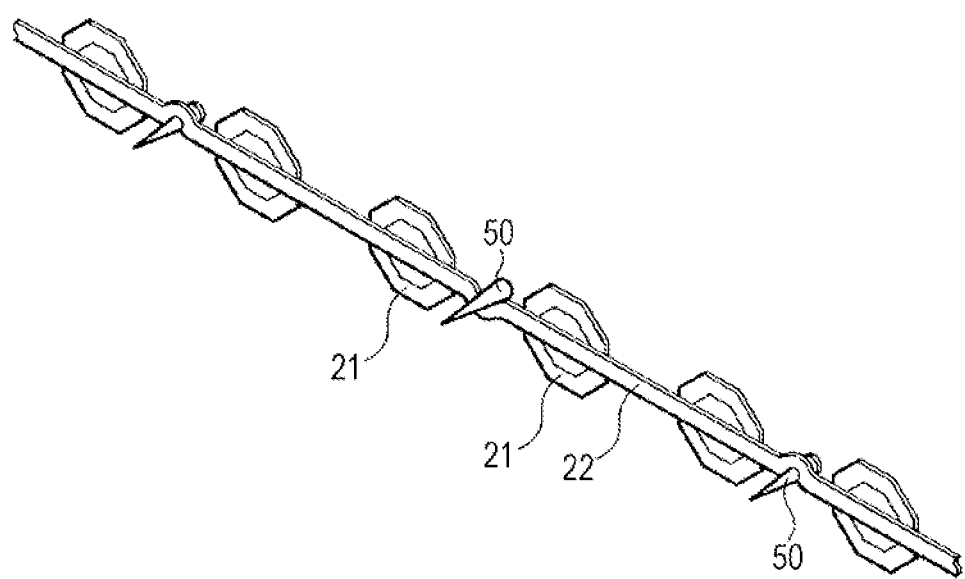
FIG. 32 is a schematic diagram illustrating a wavelength conversion unit according to a sixth modification example.

The planar shapes of the direct upper portion 21 of the wavelength conversion unit 20 and the light reflection member 60 have been set to the octagonal shapes, but an embodiment of the present technology is not limited thereto. For example, as illustrated in FIGS. 30A to 30C, the planar shapes may be tetragonal, hexagonal, or circular shapes. In this case, the planar shapes of all of the direct upper portions 21 and the light reflection members 60 may be the same shape, or several portions or members may be different shapes. The direct upper portion 21 of the wavelength conversion unit 20 or the light reflection member 60 is not limited to the film shape, but may have a stereoscopic shape. For example, a dome shape illustrated in FIG. 31A may be used. In this case, as illustrated in FIG. 31B, for example, the connection portion 22 may be placed directly on the front surface 40S of the reflection substrate 40. Further, as illustrated in FIG. 32, in the wavelength conversion units 20, for example, the plurality of direct upper portions 21 may be joined to the lower surface of one connection portion 22.

For example, the configurations of the light-emitting devices 1 and 2 and the display device 101 (television device) have been described specifically in the foregoing embodiments. However, all of the constituent elements may not be included and other constituent elements may be included.

In the foregoing third embodiment, the contour shape of the plane of the wall portion 71 of the light-shielding member 70 has been the circular shape, but another shape may be used. For example, a polygonal shape such as an octagonal shape may be used.

The advantages described in the present specification are merely exemplary but are not limited to the description, and other advantages can be obtained. Embodiments of the present technology can be configured as follows.

(1) A light-emitting device includes: a plurality of light sources configured to be disposed on a substrate; a light diffusion member configured to commonly cover the plurality of light sources; and a plurality of wavelength conversion members configured to be disposed between the light sources and the light diffusion member in a thickness direction and disposed in regions corresponding to the plurality of light sources in a plane, respectively, and configured to convert light with a first wavelength from the light sources into light with a second wavelength.

(2) The light-emitting device described in the foregoing (1) may further include light reflection members configured to be disposed between the wavelength conversion members and the light diffusion members and disposed in regions corresponding to the plurality of light sources in the plane, respectively, and configured to reflect the light transmitted through the wavelength conversion members.

(3) The light-emitting device described in the foregoing (1) or (2) may further include a first connection member configured to connect two or more of the wavelength conversion members.

(4) In the light-emitting device described in the foregoing (3), the wavelength conversion member and the first connection member may be an integrated object formed of the same material.

(5) In the light-emitting device described in the foregoing (4), a width of the first connection member may be narrower than a width of the wavelength conversion member.

(6) In the light-emitting device described in any one of the foregoing (1) to (5), a plurality of wavelength conversion units including the plurality of wavelength conversion members arranged in a first direction and first connection members connecting the plurality of wavelength conversion members arranged in the first direction to each other may be disposed in a second direction.

(7) In the light-emitting device described in any one of the foregoing (1) to (6), an interval between the light source and the wavelength conversion member may be shorter than an interval between the light diffusion member and the wavelength conversion member in the thickness direction.

(8) In the light-emitting device described in any one of the foregoing (1) to (7), a central point of the wavelength conversion member may be identical to an optical axis of the light source in an in-plane direction and satisfy a condition expression (1) below:

$$|\theta 1| < \operatorname{Tan}^{-1}(R1/L1) \qquad (1)$$

where θ1 is an angle at which emission intensity of the light source is 60% of the maximum peak (where an optical axis direction is assumed to be 0°), R1 is a median value of a circumradius and an inradius in the wavelength conversion member, and L1 is a distance between the light source and the wavelength conversion member in the thickness direction.

(9) In the light-emitting device described in the foregoing (2), a central point of the light reflection member may be identical to an optical axis of the light source in an in-plane direction and satisfy a condition expression (2) and a condition expression (3) below:

$$\operatorname{Tan}^{-1}(R2/L2) < 27°; \text{ and} \qquad (2)$$

$$R2 < R1, \qquad (3)$$

where R2 is a median value of a circumradius and an inradius in the light reflection member, and L2 is a distance between the light reflection member and the light diffusion member in the thickness direction.

(10) In the light-emitting device described in any one of the foregoing (1) to (9), the wavelength conversion member may include a quantum dot.

(11) The light-emitting device described in any one of the foregoing (1) to (10) may further include a plurality of light-shielding members configured to include a wall portion erected on the substrate to surround the light source in a plane intersecting an optical axis of the light source.

(12) In the light-emitting device described in the foregoing (11), the wavelength conversion member may be mutually separated from the light-shielding member.

(13) In the light-emitting device described in the foregoing (11) or (12), a part of the light-shielding member may reach a straight line joining the light source and an end of the wavelength conversion member.

(14) The light-emitting device described in any one of the foregoing (11) to (13) may further include a reflection sheet configured to be disposed on the substrate. A part of the reflection sheet may form the light-shielding member.

(15) The light-emitting device described in any one of the foregoing (11) to (14) may further include a second connection member configured to connect two or more of the light-shielding members.

(16) The light-emitting device described in the foregoing (15) may further include a first connection member configured to connect two or more of the wavelength conversion members. A clip gripping the first connection member may be installed in the second connection member.

(17) A light-emitting device includes: a plurality of light sources configured to be disposed on a substrate; a light diffusion member configured to commonly cover the plurality of light sources; and a plurality of wavelength conversion members configured to be disposed between the light sources and the light diffusion member in a thickness direction and have openings or notches in regions other than regions corresponding to the plurality of light sources in a plane, respectively, and configured to convert light with a first wavelength from the light sources into light with a second wavelength.

(18) A display device includes: a liquid crystal panel; and a surface light-emitting device on a rear surface side of the liquid crystal panel. The light-emitting device may include a plurality of light sources configured to be disposed on a substrate, a light diffusion member configured to commonly cover the plurality of light sources, and a plurality of wavelength conversion members configured to be disposed between the light sources and the light diffusion member in a thickness direction and disposed in regions corresponding to the plurality of light sources in a plane, respectively, and configured to convert light with a first wavelength from the light sources into light with a second wavelength.

(19) An illumination device includes a light-emitting device. The light-emitting device includes a plurality of light sources configured to be disposed on a substrate, a light diffusion member configured to commonly cover the plurality of light sources, and a plurality of wavelength conversion members configured to be disposed between the light sources and the light diffusion member in a thickness direction and disposed in regions corresponding to the plurality of light sources in a plane, respectively, and configured to convert light with a first wavelength from the light sources into light with a second wavelength.

It should be understood by those skilled in the art that various modifications, combinations, sub-combinations and alterations may occur depending on design requirements and other factors insofar as they are within the scope of the appended claims or the equivalents thereof.

What is claimed is:

1. A light-emitting device comprising:
   a plurality of light sources that emit a first wavelength light disposed on a substrate;
   a light reflection member configured to cover each of the plurality of light sources;
   a plurality of wavelength conversion members configured to be disposed between the light sources and the light reflection member in a thickness direction and disposed in regions corresponding to the plurality of light sources in a plane, respectively;
   wall portions between adjacent light sources of the plurality of light sources,
   wherein one wall portion of the wall portions surrounds one light source of the light sources and is covered by an individual wavelength conversion member of the wavelength conversion members, the individual wavelength conversion member includes a quantum dot material that converts the first wavelength light to a second wavelength light or a third wavelength light and another wall portion of the wall portions surrounds another light source of the light sources and is covered by another individual wavelength conversion member, the another individual wavelength conversion member includes another quantum dot material that converts the first wavelength light to the second wavelength light or the third wavelength light.

2. The light-emitting device of claim 1, wherein the quantum dot material and the another quantum dot material are different quantum dot material.

3. The light-emitting device of claim 1, wherein the wall portions have top flat surfaces.

4. The light-emitting device according to claim 1, wherein the plurality of wavelength conversion members are in a sheet shape.

5. The light-emitting device of claim 1, wherein the plurality of wavelength conversion members are printed in a region on a transparent substrate.

6. The light-emitting device of claim 1, further comprising an optical member over the light reflection member.

7. The light-emitting device of claim 6, wherein the light reflection member is disposed directly between the wavelength conversion members and the optical member.

8. The light-emitting device of claim 6, wherein the light reflection member is disposed between the wavelength conversion members and the optical member and is disposed in regions corresponding to the plurality of light sources in the plane, respectively, and configured to reflect the light transmitted through the wavelength conversion members.

9. The light-emitting device of claim 1, further comprising connection members, the connection members connect adjacent wavelength conversion members of the plurality of the wavelength conversion members.

10. The light-emitting device of claim 9, wherein a respective connection member of the connection members and adjacent wavelength conversion members of the wavelength conversion members are an integrated object comprising the same material.

11. The light-emitting device of claim 1, wherein an interval between a respective light source of the plurality of light sources and a corresponding wavelength conversion member of the plurality of wavelength conversion members is shorter than an interval between the optical member and the corresponding wavelength conversion member in the thickness direction.

12. The light-emitting device of claim 1, further comprising a diffusion member over the wavelength conversion members, wherein the one light source and the another light source are adjacent.

13. The light-emitting device of claim 12, wherein for each light source of the light sources, there is a central point of the light reflection member that is identical to an optical axis of each light source in an in-plane direction and satisfies a condition expression (1) and a condition expression (2):

$$\text{Tan}-1\,(R2/L2) < 27 \text{ degrees;} \qquad (1)$$

and $R2 < R1$ ... (2), where R2 is a median value of a circumradius (rr3) and an inradius (rr4) in the light reflection member, R1 is a radius obtained as a median value of a circumradius (rr1) and an inradius (rr2) in a respective direct upper portion of the respective wavelength conversion member and L2 is a distance between the light reflection member and the light diffusion member in the thickness direction.

14. The light-emitting device of claim 1, wherein the wall portions are composed of white polycarbonate.

15. The light-emitting device of claim 1, wherein the substrate is a reflective substrate.

16. The light-emitting device of claim 15, wherein the reflective substrate is a multilayer reflection substrate.

17. The light-emitting device of claim 15, wherein the reflective substrate is a white PET.

18. The light-emitting device of claim 15, wherein the light-emitting device has a curved shape.

19. The light-emitting device of claim 1, wherein the wall portions have top flat surfaces and slopes side interior surfaces that face the respective light sources.

20. The light-emitting device of claim 1, wherein at least one of the light sources is a blue light emitting diode.

* * * * *